US012560191B2

(12) United States Patent　　　(10) Patent No.: US 12,560,191 B2

Czinger et al.　　　　　　　　　(45) Date of Patent: Feb. 24, 2026

(54) RADIATION-ENABLED RETENTION FEATURES FOR FIXTURELESS ASSEMBLY OF NODE-BASED STRUCTURES

(71) Applicant: Divergent Technologies, Inc., Los Angeles, CA (US)

(72) Inventors: Lukas Philip Czinger, Santa Monica, CA (US); Vincent Arunas Burokas, Los Angeles, CA (US); Jason Vincent Gallagher, Lomita, CA (US); Chukwubuikem Marcel Okoli, Los Angeles, CA (US); Samuel Noah Miller, Marina Del Rey, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 18/506,969

(22) Filed: Nov. 10, 2023

(65) Prior Publication Data

US 2024/0075693 A1　　　Mar. 7, 2024

Related U.S. Application Data

(63) Continuation of application No. 16/940,754, filed on Jul. 28, 2020, now Pat. No. 11,850,804.

(51) Int. Cl.
| | |
|---|---|
| *B29C 65/48* | (2006.01) |
| *B29C 65/00* | (2006.01) |

(Continued)

(52) U.S. Cl.
CPC ........ *F16B 11/006* (2013.01); *B29C 65/4845* (2013.01); *B29C 66/1122* (2013.01); *B29L 2024/006* (2013.01)

(58) Field of Classification Search
CPC .. F16B 11/006; F16B 12/04; F16B 2012/046; F16B 2012/043; Y10T 403/473;

(Continued)

(56) References Cited

U.S. PATENT DOCUMENTS

| | | |
|---|---|---|
| 3,960,637 A | 6/1976 | Ostrow |
| 4,109,944 A | 8/1978 | Curtin |

(Continued)

FOREIGN PATENT DOCUMENTS

| | | |
|---|---|---|
| CN | 105309062 A | 2/2016 |
| CN | 107009614 A | 8/2017 |

(Continued)

OTHER PUBLICATIONS

US 9,202,136 B2, 12/2015, Schmidt et al. (withdrawn)

(Continued)

*Primary Examiner* — John L Goff, II

(74) *Attorney, Agent, or Firm* — ArentFox Schiff LLP

(57)　　　　ABSTRACT

Retention features are provided for joining at least two structural components in a fixtureless assembly system. A first structure including a groove may be configured to contain at least one adhesive, and a second structure may include a tongue configured to contact the at least one adhesive to join the first and second structures. The first structure may also include at least one window that receives electromagnetic (EM) radiation from an EM radiation source into the groove. The at least one adhesive is configured to cure at a first rate upon exposure to one of time or heating, and the at least one adhesive is configured to cure at a second rate faster than the first rate upon exposure to the EM radiation.

13 Claims, 19 Drawing Sheets

(51) Int. Cl.
F16B 11/00 (2006.01)
B29L 24/00 (2006.01)

(58) Field of Classification Search
CPC ............... Y10T 403/47; Y10T 403/471; Y10T
403/472; Y10T 403/7045; B29L
2024/006; B29C 65/4845; B29C 65/1406;
B29C 65/1606; B29C 65/7855; B29C
66/124–126; B29C 66/3032; B29C
66/30325; B29C 66/1122; B32B 3/30
USPC .......................... 403/268, 265, 266, 267, 364
See application file for complete search history.

(56) References Cited

U.S. PATENT DOCUMENTS

| | | | |
|---|---|---|---|
| 4,250,596 | A | 2/1981 | Hara et al. |
| 5,203,226 | A | 4/1993 | Hongou et al. |
| 5,742,385 | A | 4/1998 | Champa |
| 5,854,431 | A | 12/1998 | Linker et al. |
| 5,990,444 | A | 11/1999 | Costin |
| 6,010,155 | A | 1/2000 | Rinehart |
| 6,021,753 | A | 2/2000 | Chaffin et al. |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,540,855 | B1 | 4/2003 | Holmberg |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,849,150 | B1 | 2/2005 | Schmidt |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |
| 9,765,226 | B2 | 9/2017 | Dain |

(56) References Cited

U.S. PATENT DOCUMENTS

| | | |
|---|---|---|
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |

(56) References Cited

U.S. PATENT DOCUMENTS

| | | | |
|---|---|---|---|
| 10,289,263 B2 | 5/2019 | Troy et al. | |
| 10,289,875 B2 | 5/2019 | Singh et al. | |
| 10,291,193 B2 | 5/2019 | Dandu et al. | |
| 10,294,552 B2 | 5/2019 | Liu et al. | |
| 10,294,982 B2 | 5/2019 | Gabrys et al. | |
| 10,295,989 B1 | 5/2019 | Nevins | |
| 10,303,159 B2 | 5/2019 | Czinger et al. | |
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 11,034,024 B2 | 6/2021 | Saez et al. | |
| 11,534,975 B2 | 12/2022 | Ribble et al. | |
| 11,559,897 B2 | 1/2023 | Ghanem | |
| 11,603,150 B2 | 3/2023 | Chami et al. | |
| 11,850,804 B2 * | 12/2023 | Czinger | B29C 66/1122 |
| 2002/0015615 A1 | 2/2002 | Hanlon | |
| 2006/0108783 A1 | 5/2006 | Ni et al. | |
| 2006/0243382 A1 | 11/2006 | Kilwin et al. | |
| 2007/0114227 A1 * | 5/2007 | Stumpf | B29C 65/3612 |
| | | | 403/361 |
| 2007/0261787 A1 | 11/2007 | Malis | |
| 2009/0279829 A1 | 11/2009 | Popp et al. | |
| 2010/0142359 A1 | 6/2010 | Sakata et al. | |
| 2013/0290423 A1 | 10/2013 | Bao et al. | |
| 2013/0309436 A1 | 11/2013 | Vanimisetti et al. | |
| 2014/0212637 A1 | 7/2014 | Syvret et al. | |
| 2014/0241790 A1 | 8/2014 | Woleader et al. | |
| 2014/0277669 A1 | 9/2014 | Nardi et al. | |
| 2015/0117047 A1 | 4/2015 | Kosugi et al. | |
| 2015/0145386 A1 | 5/2015 | Chang | |
| 2015/0230600 A1 | 8/2015 | Schulte | |
| 2015/0289606 A1 | 10/2015 | Coakley et al. | |
| 2016/0061381 A1 | 3/2016 | Kotliar | |
| 2016/0250802 A1 | 9/2016 | Odaka | |
| 2016/0250807 A1 | 9/2016 | Atwood | |
| 2017/0113344 A1 | 4/2017 | Schönberg | |
| 2017/0341309 A1 | 11/2017 | Piepenbrock et al. | |
| 2018/0022019 A1 | 1/2018 | Levine et al. | |
| 2018/0111329 A1 | 4/2018 | Tanaka et al. | |
| 2018/0154583 A1 * | 6/2018 | Evans | F16B 11/006 |
| 2018/0290423 A1 * | 10/2018 | Twelves, Jr. | B32B 7/12 |
| 2018/0363691 A1 | 12/2018 | Gunner et al. | |
| 2019/0048912 A1 | 2/2019 | Czinger et al. | |
| 2019/0146456 A1 | 5/2019 | Czinger et al. | |
| 2020/0147684 A1 | 5/2020 | Bowden et al. | |
| 2021/0154950 A1 | 5/2021 | Czinger | |
| 2022/0089237 A1 | 3/2022 | Sverdlov et al. | |

FOREIGN PATENT DOCUMENTS

| | | |
|---|---|---|
| EP | 3385076 A1 | 10/2018 |
| JP | H08-244156 A | 9/1996 |
| JP | H1040596 A | 2/1998 |
| JP | H10-296155 A | 11/1998 |
| JP | 2009-083491 A | 4/2009 |
| JP | 2013-006269 A | 1/2013 |
| JP | 2013-505343 A | 2/2013 |
| JP | 2013-205498 A | 10/2013 |
| JP | 2015-120324 A | 7/2015 |
| JP | 2018-016056 A | 2/2018 |
| JP | 2018-034398 A | 3/2018 |
| JP | 2019-518126 A | 6/2019 |
| JP | 2019-160973 A | 9/2019 |
| JP | 2020-521641 A | 7/2020 |
| KR | 10-2022-0052411 | 4/2022 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2018/077366 A1 | 5/2018 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

(56)                References Cited

FOREIGN PATENT DOCUMENTS

| | | | | | |
|---|---|---|---|---|---|
| WO | WO-2019166778 A1 | * | 9/2019 | .......... | H02K 11/215 |
| WO | WO-2020099156 A1 | * | 5/2020 | ........... | F16B 11/006 |

OTHER PUBLICATIONS

US 9,809,265 B2, 11/2017, Kinjo (withdrawn)

US 10,449,880 B2, 10/2019, Mizobata et al. (withdrawn)

Bone, G.M. et al., "Vision-guided fixtureless assembly of automotive components", Department of Mechanical Engineering, McMaster Manufacturing Research Institute, McMaster University, Hamilton, Ont., Canada L8S 4L7b, Robotics and Computer Integrated Manufacturing, 19, pp. 79-87, 2003, Elsevier Science Ltd., [www.elsevier.com/locate/rcim].

Cai, Y. et al., "Automated Robotic Assembly of 3D Mesostructure via Guided Mechanical Buckling", 2021 IEEE 17th International Conference on Automation Science and Engineering (CASE), 978-1-6654-1873, Aug. 23-27, 2021, Lyon, France.

Pires, N. et al., "The role of robotics in additive manufacturing: review of the AM processes and introduction of an intelligent system", The international journal of robotics research and application © Emerald Publishing Limited [ISSN 0143-991X], [DOI 10.1108/IR-06-2021-0110], Dec. 28, 2021, Emerald insight: [https://www.emerald.com/insight/0143-991X.htm].

English translation of Published Application, KR 20220052411 A, Apr. 28, 2022, 6 pages.

Corona-Castuera et al., "An Approach for Intelligent Fixtureless Assembly: Issues and Experiments", Springer-Verlag Berlin Heidelberg, Eds. MICAI 2005, LNAI 3789, 2005, pp. 1052-1061.

Decision to grant received for Japanese Patent Application No. 2021-524347, mailed on Oct. 29, 2024, 5 pages (3 pages of Original OA and 2 pages of English Translation).

European Search Report received for Patent Application No. 21850495.9, mailed on Jul. 12, 2024, 6 pages.

Extended European Search Report in EP19882138, mailed Aug. 9, 2022, 7 pages.

International Search Report & Written Opinion received in PCT/US2019/060400 mailed Jan. 22, 2020, 9 pages.

International Search Report and the Written Opinion issued for corresponding International Application No. PCT/US21/40332, mailed Dec. 13, 2021, 12 pages.

Mills et al., "Robotic Fixtureless Assembly of Sheet Metal Parts Using Dynamic Finite Element Models: Modelling and Stimulation", IEEE International Conference on Robotics and Automation, 1995, pp. 2530-2537.

Office Action received for Chinese Patent Application No. 202180066466.X, mailed on Mar. 19, 2025, 27 pages (14 pages of English Translation and 13 pages of Original Office Action).

Office Action received for Japanese Patent Application No. 2021-524347, mailed on Apr. 30, 2024, 6 pages (3 pages of English Translation and 3 pages of Original Document).

Ogun et al., "3D Vision Assisted Flexible Robotic Assembly of Machine Components", IN: Proceedings of 2015 8th International Conference on Machine Vision (ICMV 2015), Barcelona, spain, vol. 9875, Nov. 19-21, 2015, 8 pages.

Richardot, Sculpteo, "How to connect to parts with 3D printed joints and snap fits", 2018, pp. 1-10.

Third Office Action in CN201810970640.3, mailed Jul. 8, 2022, 23 pages (13 pages of English Translation and 10 pages of Original copy attached).

Office Action received for Japanese Patent Application No. 2023-504404, Mailed on Apr. 15, 2025, 10 Pages (5 Pages of English Translation and 5 Pages of Original Copy).

Office Action received for Japanese Patent Application No. 2023-504404, mailed on Oct. 28, 2025, 12 pages (6 pages of English Translation and 6 pages of Original Document).

* cited by examiner

First
Structure
200

Window
204

Groove
202

First
Structure
200

Window
204

Groove
202

Second
Structure
300

Plurality of
Segments
304

Tongue
302

Second
Structure
300

Plurality of
Segments
304

Tongue
302

Subassembly
400

Quick-Cure
Adhesive
404

First Structure
402

Second Structure
406

Subassembly 400

Quick-Cure Adhesive 404

First Structure 402

Second Structure 406

Tongue Types
500

Waffle Shape
502

Fork Shape
504

Comb Shape
506

Loop Shape
508

Snake Shape
510

First
Structure
700

Structural and
Quick-Cure
Adhesive
704

Compartment
706

Windows
708

Groove
702

Fixtureless
Assembly
System 800

Groove 806

First
Structure 804

Quick-Cure
Adhesive Robot
818

Quick-Cure Adhesive
Applicator 820

Structural
Adhesive 816

Quick-Cure
Adhesive 822

Assembly
Robot
802

Fixtureless
Assembly
System 800

Second
Structure 826

Tongue 828

End
Effector 830

Parts Table 808

Assembly
Robot 824

Fixtureless
Assembly
System
800

Processing
System 900

RADIATION-ENABLED RETENTION FEATURES FOR FIXTURELESS ASSEMBLY OF NODE-BASED STRUCTURES

CROSS-REFERENCE TO RELATED APPLICATIONS

This application is a continuation of U.S. patent application Ser. No. 16/940,754 entitled "RADIATION-ENABLED RETENTION FEATURES FOR FIXTURELESS ASSEMBLY OF NODE-BASED STRUCTURES", filed Jul. 28, 2020, now U.S. Pat. No. 11,850,804, which is assigned to the assignee hereof, and incorporated by reference in its entirety as if fully set forth herein.

BACKGROUND

Field

The present disclosure relates to a retention feature for assembling structures, and more specifically to a radiation-enabled retention feature for fixtureless assembly of structures.

Background

A vehicle such as an automobile, truck or aircraft is made of a large number of individual structural components joined together to form the body, frame, interior and exterior surfaces, etc. These structural components provide form to the automobile, truck and aircraft, and respond appropriately to the many different types of forces that are generated or that result from various actions like accelerating and braking. These structural components also provide support. Structural components of varying sizes and geometries may be integrated in a vehicle, for example, to provide an interface between panels, extrusions, and/or other structures. Thus, structural components are an integral part of vehicles.

Modern automobile factories rely heavily on robotic assembly of structural components. However, robotic assembly of automobile components typically relies on the use of fixtures to securely retain the structural components during the assembly process. For example, in automobile factories, each part of the automobile that will be robotically assembled may require a unique fixture that is specific to that part. Given the large number of individual parts in an automobile that are robotically assembled, an equally large number of fixtures may be required, resulting in increased cost. In addition, fixtures can generally only be used for the specific part for which they are designed.

SUMMARY

Several aspects of an assembly system including apparatuses for joining at least two structural components without the use of fixtures when robotically assembling at least a portion of a vehicle will be described more fully hereinafter.

In various aspects, an apparatus may include a first structure including a groove configured to contain at least one adhesive to join the first structure to a second structure, and at least one window that receives electromagnetic (EM) radiation into the groove. The at least one adhesive cures at a first rate upon exposure to one of time or heating, and the at least one adhesive cures at a second rate faster than the first rate upon exposure to the EM radiation.

In various aspects, an assembly system may include a first material handling robot configured to retain a first structure, where the first structure includes a groove containing at least one adhesive. The assembly system may also include an EM radiation source configured to emit EM radiation into the groove. The at least one adhesive cures at a first rate upon exposure to one of time or heating, and the at least one adhesive cures at a second rate faster than the first rate upon exposure to the EM radiation.

In various aspects, an apparatus may include a first structure including a groove containing at least one adhesive, and a second structure joined to the first structure and including a tongue contacting the at least one adhesive. The at least one adhesive is configured to cure at a first rate upon exposure to one of time or heating, and the at least one adhesive is configured to cure at a second rate faster than the first rate upon exposure to EM radiation.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

To provide a more economical approach for robotically assembling a transport structure (e.g. an automobile chassis) without requiring numerous fixtures that are dependent on the chassis design, a fixtureless, non-design specific assembly for structural components may be used. For example, a robot may be configured to directly hold a structure, e.g., using an end effector of a robotic arm, and to position and join that structure with another structure held by another robot during the assembly process. The structures may be, for example, nodes, tubes, extrusions, panels, pieces, parts, components, assemblies or subassemblies (e.g. including at least two previously joined structures) and the like. For instance, a structure or a part may be at least a portion or section associated with a vehicle, such as a vehicle chassis, panel, base piece, body, frame, and/or another vehicle component. A node is a structure that may include one or more interfaces used to connect to other structures (e.g. tubes, panels, etc.). The structures may be produced using additive manufacturing (AM) (e.g. 3-D printing).

Figure 1:
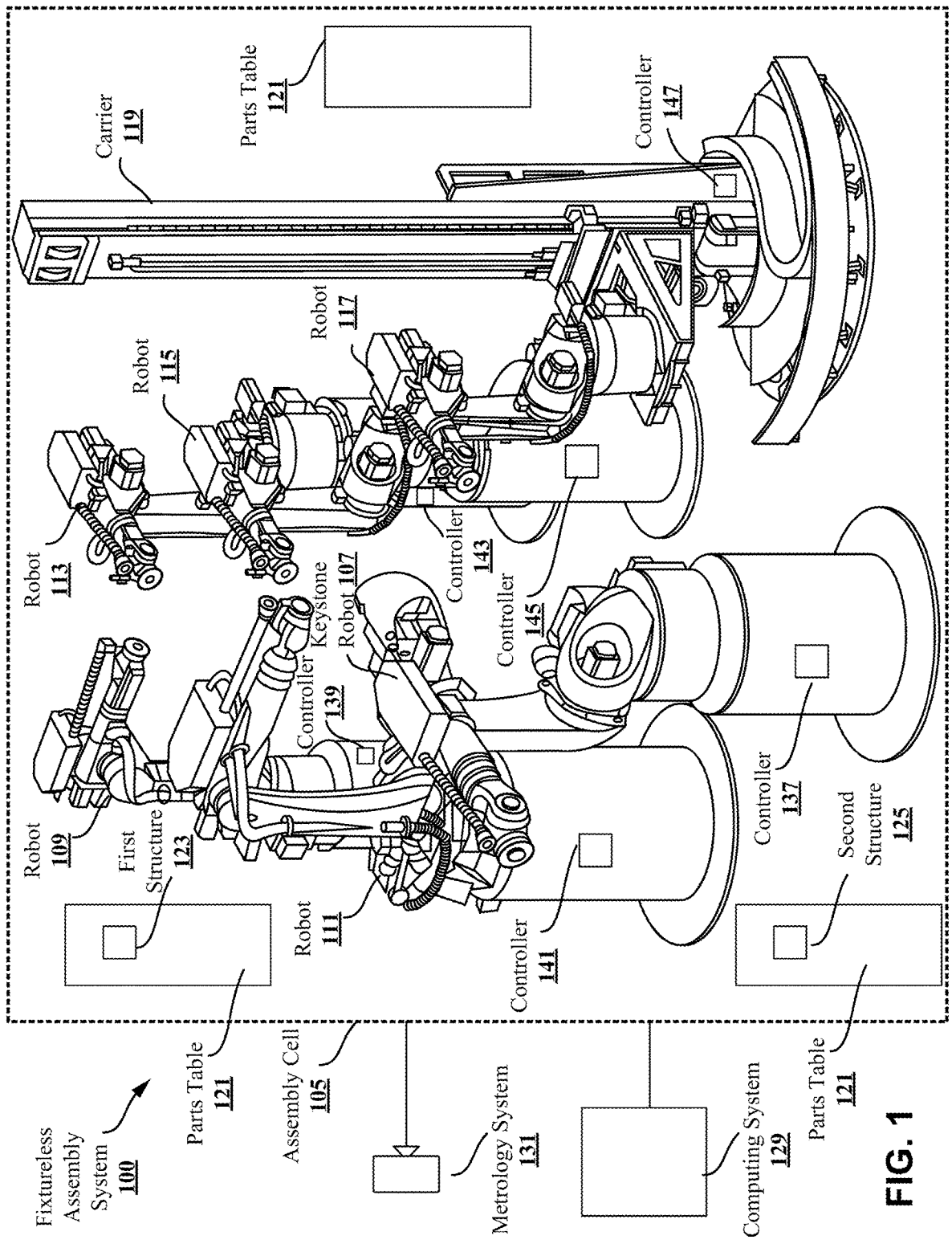
FIG. 1 illustrates a perspective view of an example assembly system, which includes a plurality of robots configured to assemble at least a portion of a vehicle.

FIG. 1 illustrates a perspective view of an example of a fixtureless assembly system 100. Fixtureless assembly system 100 may be employed in various operations associated with fixtureless assembly of a vehicle, such as robotic assembly of a node-based vehicle. Fixtureless assembly system 100 may include one or more elements associated with at least a portion of the assembly of a vehicle without any fixtures. For example, one or more elements of fixtureless assembly system 100 may be configured for one or more operations in which a first structure is joined with one or more other structures without the use of any fixtures during robotic assembly of a node-based vehicle.

An assembly cell 105 may be configured at the location of fixtureless assembly system 100. Assembly cell 105 may be a vertical assembly cell. Within assembly cell 105, fixtureless assembly system 100 may include a set of robots 107, 109, 111, 113, 115, 117. Robot 107 may be referred to as a keystone robot. Fixtureless assembly system 100 may include parts tables 121 that can hold parts and structures for the robots to access. For example, a first structure 123 and a second structure 125 may be positioned on one of parts tables 121 to be picked up by the robots and assembled together. In various embodiments, one or more of the structures can be an additively manufactured structure, such as a complex node.

Fixtureless assembly system 100 may also include a computing system 129 to issue commands to the various controllers of the robots of assembly cell 105. In this example, computing system 129 is communicatively connected to the robots through wireless communication. Fixtureless assembly system 100 may also include a metrology system 131 that can accurately measure the positions of the robotic arms of the robots and/or the structures held by the robots.

In contrast to conventional robotic assembly factories, structures can be assembled without fixtures in fixtureless assembly system 100. For example, structures need not be connected within any fixtures, such as the fixtures described above. Instead, at least one of the robots in assembly cell 105 may provide the functionality expected from fixtures. For example, robots may be configured to directly contact (e.g., using an end effector of a robotic arm) structures to be assembled within assembly cell 105 so that those structures may be engaged and retained without any fixtures. Further, at least one of the robots may provide the functionality expected from the positioner and/or fixture table. For example, keystone robot 107 may replace a positioner and/or fixture table in fixtureless assembly system 100.

Keystone robot 107 may include a base and a robotic arm. The robotic arm may be configured for movement, which may be directed by computer-executable instructions loaded into a processor communicatively connected with keystone robot 107. Keystone robot 107 may contact a surface of assembly cell 105 (e.g., a floor of the assembly cell) through the base.

Keystone robot 107 may include and/or be connected with an end effector that is configured to engage and retain a first structure, e.g., a portion of a vehicle. An end effector may be a component configured to interface with at least one structure. Examples of the end effectors may include jaws, grippers, pins, or other similar components capable of facilitating fixtureless engagement and retention of a structure by a robot. In some embodiments, the first structure may be a section of a vehicle chassis, body, frame, panel, base piece, and the like. For example, the first structure may comprise a floor panel.

In some embodiments, keystone robot 107 may retain the connection with a first structure through an end effector while a set of other structures is connected (either directly or indirectly) to the first structure. Keystone robot 107 may be configured to engage and retain the first structure without any fixtures—e.g., none of the fixtures described above may be present in fixtureless assembly system 100. In some embodiments, structures to be retained by at least one of the robots (e.g., the first structure) may be additively manufactured or co-printed with one or more features that facilitate engagement and retention of those structures by the at least one of the robots without the use of any fixtures.

In retaining the first structure, keystone robot 107 may position (e.g., move) the first structure; that is, the position of the first structure may be controlled by keystone robot 107 when retained by the keystone robot. Keystone robot 107 may retain the first structure by holding or grasping the first structure, e.g., using an end effector of a robotic arm of the keystone robot. For example, keystone robot 107 may retain the first structure by causing gripper fingers, jaws, and the like to contact one or more surfaces of the first structure and apply sufficient pressure thereto such that the keystone robot controls the position of the first structure. That is, the first structure may be prevented from moving freely in space when retained by keystone robot 107, and movement of the first structure may be constrained by the keystone robot. As described above, the first structure may include one or more features that facilitates the fixtureless engagement and retention of the first structure by keystone robot 107.

As other structures (including subassemblies, substructures of structures, etc.) are connected to the first structure, keystone robot 107 may retain the engagement with the first structure through the end effector. The aggregate of the first structure and one or more structures connected thereto may be referred to as a structure itself, but may also be referred to as an assembly or a subassembly. Keystone robot 107 may retain an engagement with an assembly once the keystone robot has engaged the first structure.

In some embodiments, robots 109 and 111 of assembly cell 105 may be similar to keystone robot 107 and, thus, may include respective end effectors configured to engage with structures that may be connected with the first structure when retained by the keystone robot. In some embodiments, robots 109, 111 may be referred to as assembly robots and/or materials handling robots.

In some embodiments, robot 113 of assembly cell 105 may be used to affect a structural connection between the first structure and the second structure. For instance, robot 113 may be referred to as a structural adhesive robot. Structural adhesive robot 113 may be similar to the keystone robot 107, except the structural adhesive robot may include a tool at the distal end of the robotic arm that is configured to apply structural adhesive to at least one surface of structures fixturelessly retained by the keystone robot and structures fixturelessly retained by assembly robots 109, 111 before or after the structures are positioned at joining proximities with respect to other structures for joining with the other structures. The joining proximity can be a position that allows a first structure to be joined to a second structure. For example, in various embodiments, the first and second structures may be joined though the application of an adhesive while the structures are within the joining proximity and subsequent curing of the adhesive.

In various embodiments a quick-cure adhesive may be additionally applied to join the structures quickly and retain the structures so that the structural adhesive can cure without requiring both robots to hold the structures. In this regard, robot 115 of fixtureless assembly system 100 may be used to apply quick-cure adhesive and to cure the adhesive quickly. In this example embodiment, a quick-cure UV adhesive may be used, and robot 115 may be referred to as a UV robot. UV robot 115 may be similar to keystone robot 107, except the UV robot may include a tool at the distal end of the robotic arm that is configured to apply a quick-cure UV adhesive and to cure the adhesive, e.g., when the first structure is positioned within the joining proximity with respect to the second structure. That is, UV robot 115 may cure an adhesive after the adhesive is applied to the first structure and/or second structure when the structures are within the joining proximity obtained through direction of at least one of the robotic arms of keystone robot 107 and/or assembly robots 109, 111.

In various embodiments, a robot may be used for multiple different roles. For example, robot 117 may perform the role of an assembly robot, such as assembly robots 109, 111, and the role of a UV robot, such as UV robot 115. In this regard, robot 117 may be referred to as an "assembly/UV robot." Assembly/UV robot 117 may offer functionality similar to each of the assembly robots 109, 111 when the distal end of the robotic arm of the assembly/UV robot includes an end effector (e.g., connected by means of a tool flange). However, assembly/UV robot 117 may offer functionality similar to UV robot 115 when the distal end of the robotic arm of the assembly/UV robot includes a tool configured to applied UV adhesive and to emit UV light to cure the UV adhesive.

The quick-cure adhesive applied by UV robot 115 and assembly/UV robot 117 may provide a partial adhesive bond in that the adhesive may retain the relative positions of a first structure and a second structure within the joining proximity until the structural adhesive may be cured to permanently join the first structure and the second structure.

In assembling at least a portion of a vehicle in assembly cell 105, the second structure may be joined directly to the first structure by directing the various fixtureless robots 107, 109, 111, 113, 115, 117. Additional structures may be indirectly joined to the first structure. For example, the first structure may be directly joined to the second structure through movement(s) of keystone robot 107, structural adhesive robot 113, at least one assembly robot 109, 111, and/or UV robot 115. Thereafter, the first structure, joined with the second structure, may be indirectly joined to an additional structure as the additional structure is directly joined to the second structure. Thus, the first structure, which may continue to be retained by keystone robot 107, may evolve throughout an assembly process as additional structures are directly or indirectly joined to it.

In some embodiments, assembly robots 109, 111 may fixturelessly join two or more structures together, e.g., with a partial, quick-cure adhesive bond, before fixturelessly joining those two or more structures with the first structure retained by keystone robot 107. The two or more structures that are joined to one another prior to being joined with a structural assembly may also be a structure, and may further be referred to as a subassembly. Accordingly, when a structure forms a portion of a structural subassembly that is connected with the first structure through movements of keystone robot 107, structural adhesive robot 113, at least one assembly robot 109, 111, and UV robot 115, a structure of the structural subassembly may be indirectly connected to the first structure when the structural subassembly is joined to a structural assembly including the first structure.

In some embodiments, the structural adhesive may be applied, e.g., deposited in a groove of one of the structures, before the first and second structures are brought within the joining proximity. For example, structural adhesive robot 113 may include a dispenser for a structural adhesive and may apply the structural adhesive prior to the structures being brought within the joining proximity. In some embodiments, a structural adhesive may be applied after a structural assembly is fully constructed (that is, once each structure of the portion of the vehicle is joined to the first structure). For example, the structural adhesive may be applied to one or more joints or other connections between the first structure and the second structure. In some embodiments, the structural adhesive may be applied separately from fixtureless assembly system 100.

After the assembly is complete, i.e., all of the structures have been assembled, retained with a partial adhesive bond, with structural adhesive having been applied, the structural adhesive may be cured. Upon curing the structural adhesive, the portion of the vehicle may be completed and, therefore, may be suitable for use in the vehicle. For example, a completed structural assembly may meet any applicable industry and/or safety standards defined for consumer and/or commercial vehicles.

According to various embodiments, one or more of robots 107, 109, 111, 113, 115, 117 may be secured to a surface of assembly cell 105 through a respective base of each of the robots. For example, one or more of the robots may have a base that is bolted to the floor of the assembly cell. In various other embodiments, one or more of the robots may include or may be connected with a component configured to move the robot within assembly cell 105. For example, a carrier 119 in assembly cell 105 may be connected to assembly/UV robot 117.

Each of robots 107, 109, 111, 113, 115, 117 may include features that are common across all or some of the robots. For example, all of the robots may include a base, each of which having a surface (e.g., a bottom surface) that contacts assembly cell 105 (e.g., rests on or is secured to a floor of the assembly cell). Each base may have another surface (e.g., a top surface and/or a surface disposed on the base opposite from the surface contacting assembly cell 105) and, at a respective other surface, a base may connect with a proximal end of a respective robotic arm of a respective one of the robots.

In some embodiments, a base may be connected to the proximal end of a robotic arm through at least one rotation and/or translation mechanism. The at least one rotation and/or translation mechanism may provide at least one degree of freedom in movement of an end effector or other tool of the robotic arm. Correspondingly, the at least one rotation and/or translation mechanism may provide at least one degree of freedom in movement of a structure that is engaged and retained by an end effector or other tool of the robotic arm.

Each robotic arm of robots 107, 109, 111, 113, 115, 117 may include a distal end, oppositely disposed from the proximal end of the robotic arm. Each robotic arm of each of the robots may include an end effector and/or a tool, such as an adhesive application tool, curing tool, and so forth. An end effector or a tool may be at the distal end of a robotic arm. In some embodiments, the distal end of a robotic arm may be connected to an end effector or a tool (or tool flange) through at least one rotation and/or translation mechanism, which may provide at least one degree of freedom in movement of the tool and/or movement of a structure engaged and retained by the tool of the robotic arm.

In some embodiments, the distal end of a robotic arm may include a tool flange, and a tool included at the tool flange; for example, a tool may be connected to the distal end of a robotic arm by means of the tool flange. A tool flange may be configured to include a plurality of tools. In this way, for example, the assembly/UV robot 117 may offer functionality similar to each of the assembly robots 109, 111 when a distal end of a robotic arm of the assembly/UV robot 117 includes an end effector (e.g., connected by means of the tool flange). In addition, the assembly/UV robot 117 may offer functionality similar to the UV robot 115 when the distal end of the robotic arm of the assembly/UV robot 117 includes a tool configured to apply UV adhesive and to emit UV light to cure the adhesive.

According to some embodiments, a tool flange and/or tool may provide one or more additional degrees of freedom for rotation and/or translation of a structure engaged and retained by the tool. Such additional degrees of freedom may supplement the one or more degrees of freedom provided through one or more mechanisms connecting a base to the proximal end of a robotic arm and/or connecting the distal end of a robotic arm to the tool (or tool flange). Illustratively, a robotic arm of at least one of robots 107, 109, 111, 113, 115, 117 may include at least one joint configured for rotation and/or translation at a distal and/or proximal end, such as an articulating joint, a ball joint, and/or other similar joint.

One or more of the respective connections of robots 107, 109, 111, 113, 115, 117 (e.g., one or more rotational and/or translational mechanisms connecting various components of one of the robots), a respective tool flange, and/or a respective tool may provide at least a portion (and potentially all) of six degrees of freedom (6DoF) for a structure engaged and retained by the robots. The 6DoF may include forward/backward (e.g., surge), up/down (e.g., heave), left/right (e.g., sway) for translation in space and may further include yaw, pitch, and roll for rotation in space. Access to various portions of a structure may be attainable through one or more of the 6DoF, as opposed to retention of a structure using a fixture, which cannot offer 6DoF in movement of a structure and also blocks access to an significant portion of a structure attached thereto.

Each of the robots 107, 109, 111, 113, 115, 117 may be communicatively connected with a controller, such as a respective one of controllers 137, 139, 141, 143, 145, 147 shown in FIG. 1. Each of controllers 137, 139, 141, 143, 145, 147 may include, for example, a memory and a processor communicatively connected to the memory (e.g., as described with respect to FIG. 9, below). According to some other embodiments, one or more of controllers 137, 139, 141, 143, 145, 147 may be implemented as a single controller that is communicatively connected to one or more of the robots controlled by the single controller.

Computer-readable instructions for performing fixtureless assembly can be stored on the memories of controllers 137, 139, 141, 143, 145, 147, and the processors of the controllers can execute the instructions to cause robots 107, 109, 111, 113, 115, 117 to perform various fixtureless operations, such as those described above.

Controllers 137, 139, 141, 143, 145, 147 may be communicatively connected to one or more components of an associated robot 107, 109, 111, 113, 115, or 117, for example, via a wired (e.g., bus or other interconnect) and/or wireless (e.g., wireless local area network, wireless intranet) connection. Each of the controllers may issue commands, requests, etc., to one or more components of the associated robot, for example, in order to perform various fixtureless operations.

According to some embodiments, controllers 137, 139, 141, 143, 145, 147 may issue commands, etc., to a robotic arm of the associated robot 107, 109, 111, 113, 115, or 117 and, for example, may direct the robotic arms based on a set of absolute coordinates relative to a global cell reference frame of assembly cell 105. In various embodiments, controllers 137, 139, 141, 143, 145, 147 may issue commands, etc., to tools connected to the distal ends of the robotic arms. For example, the controllers may control operations of the tool, including depositing a controlled amount of adhesive on a surface of the first structure or second structure by an adhesive applicator, exposing adhesive deposited between structures to UV light for a controlled duration by a curing tool, and so forth. In various embodiments, controllers 137, 139, 141, 143, 145, 147 may issue commands, etc., to end effectors at the distal ends of the robotic arms. For example, the controllers may control operations of the end effectors, including, engaging, retaining, and/or manipulating a structure.

According to various other aspects, a computing system, such as computing system 129, similarly having a processor and memory, may be communicatively connected with one or more of controllers 137, 139, 141, 143, 145, 147. In various embodiments, the computing system may be communicatively connected with the controllers via a wired and/or wireless connection, such as a local area network, an intranet, a wide area network, and so forth. In some embodiments, the computing system may be implemented in one or more of controllers 137, 139, 141, 143, 145, 147. In some other embodiments, the computing system may be located outside assembly cell 105. One example of such a computing system is described below with respect to FIG. 9.

The processor of the computing system may execute instructions loaded from memory, and the execution of the instructions may cause the computing system to issue commands, etc., to the controllers 137, 139, 141, 143, 145, 147, such as by transmitting a message including the command, etc., to one of the controllers over a network connection or other communication link.

According to some embodiments, one or more of the commands may indicate a set of coordinates and may indicate an action to be performed by one of robots 107, 109, 111, 113, 115, 117 associated with the one of the controllers that receives the command. Examples of actions that may be indicated by commands include directing movement of a robotic arm, operating a tool, engaging a structure by an end effector, rotating and/or translating a structure, and so forth. For example, a command issued by a computing system may cause controller 139 of assembly robot 109 to direct a robotic arm of assembly robot 109 so that the distal end of the robotic arm may be located based on a set of coordinates that is indicated by the command.

The instructions loaded from memory and executed by the processor of the computing system, which cause the controllers to control actions of the robots may be based on computer-aided design (CAD) data. For example, a CAD model of assembly cell 105 (e.g., including CAD models of the physical robots) may be constructed and used to generate the commands issued by the computing system.

Accordingly, in one example of a fixtureless assembly process, multiple robots (e.g., robots 107, 109, 111, 113, 115, and/or 117) are controlled (e.g., by computing system 129 and/or one or more controller(s) 137, 139, 141, 143, 145, 147) to join two structures together within an assembly cell (e.g. a vertical assembly cell such as assembly cell 105). The assembly operations may be performed repeatedly so that multiple structures may be joined for fixtureless assembly of at least a portion of a vehicle (e.g., vehicle chassis, body, panel, and the like). A first material handling robot (e.g., robot 109) may retain (e.g. using an end effector) a first structure (e.g., first structure 123) that is to be joined with a second structure (e.g., second structure 125) similarly retained by a second material handling robot (e.g., robot 111). A structural adhesive dispensing robot (e.g., robot 113) may apply structural adhesive to a surface of the first structure retained by the first robot. The first material handling robot may then position the first structure at a joining proximity with respect to the second structure retained by the second material handling robot. A metrology system (e.g., metrology system 131) may implement a move-measure-correct (MMC) procedure to accurately measure, correct, and move the robotic arms of the robots and/or the structures held by the robots into optimal positions at the joining proximity (e.g. using laser scanning and/or tracking).

The positioned structures (e.g., structures 123, 125) may then be joined together using the structural adhesive and cured (e.g. over time or using heat). However, as the curing rate of the structural adhesive may be relatively long, a quick-cure adhesive robot (e.g., robot 115 or robot 117) additionally applies a quick-cure adhesive to the first and/or second structures when the first and second structures are within the joining proximity, and then the quick-cure adhesive robot switches to an end-effector which emits electromagnetic (EM) radiation (e.g. ultraviolet (UV) radiation) onto the quick-cure adhesive. For example, the quick-cure adhesive robot may apply UV adhesive strips across the surfaces of the first and/or second structures such that the UV adhesive contacts both structures, and then the robot may emit UV radiation onto the UV adhesive strips. Upon exposure to the EM radiation, the quick-cure adhesive cures at a faster curing rate than the curing rate of the structural adhesive, thus allowing the first and second structure to be retained in their relative positions without fixtures so that the robots may quickly attend to other tasks (e.g. retaining and joining other parts) without waiting for the structural adhesive to cure. Once the structural adhesive cures, the first and second structures are bonded with structural integrity.

However, as the first and second structures in the joining proximity may be oriented in a variety of positions, the UV adhesive strips contacting the surface(s) may occasionally move (e.g. drip off). For instance, one structure may be positioned upside-down relative to another structure, and the UV adhesive may therefore drip off due to gravity. As a result, when the UV adhesive is cured, the first and second structures may be inadvertently retained in positions that do not provide acceptable tolerance, impacting the structural integrity of the assembly.

Difficulties in applying UV adhesive at the joining proximity may also cause improper retention of structures. For example, the material handling robots retaining the first and second structures in the joining proximity may be tightly packed in the assembly cell. As a result, a quick-cure adhesive robot may have difficulty maneuvering around the material handling robots and applying the UV adhesive to the structures in the joining proximity within this tightly packed area. Moreover, since the metrology system may also be using laser tracking to perform MMC for these structures in this tightly packed area, the quick-cure adhesive robot may potentially obstruct the lasers and the MMC process when attempting to apply the UV adhesive. As a result, the entire assembly may be impacted. For instance, when assemblies are formed by stacking different parts, the misalignment of one structure may affect the alignment of other parts which the structure supports. Additionally, since structures and subassemblies are frequently moved during the assembly process, an improper retention may cause the structures or subassemblies to deflect or drop from the assembly.

Figure 2A:
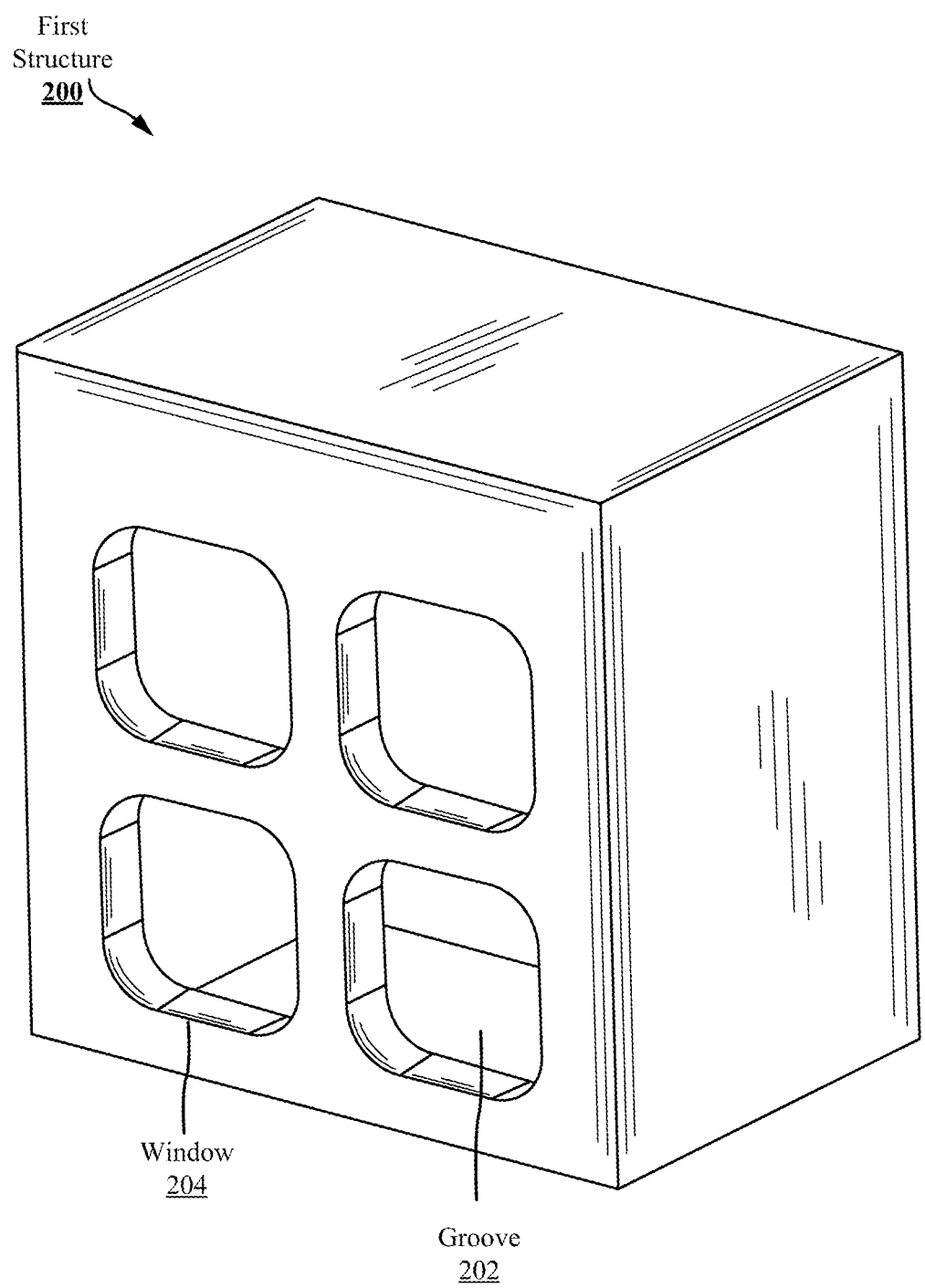
FIGS. 2A-2B illustrate an example of a first structure including a groove for containing a quick-cure adhesive.
Figure 2B:
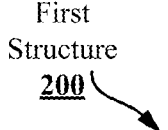
Figure 2B:
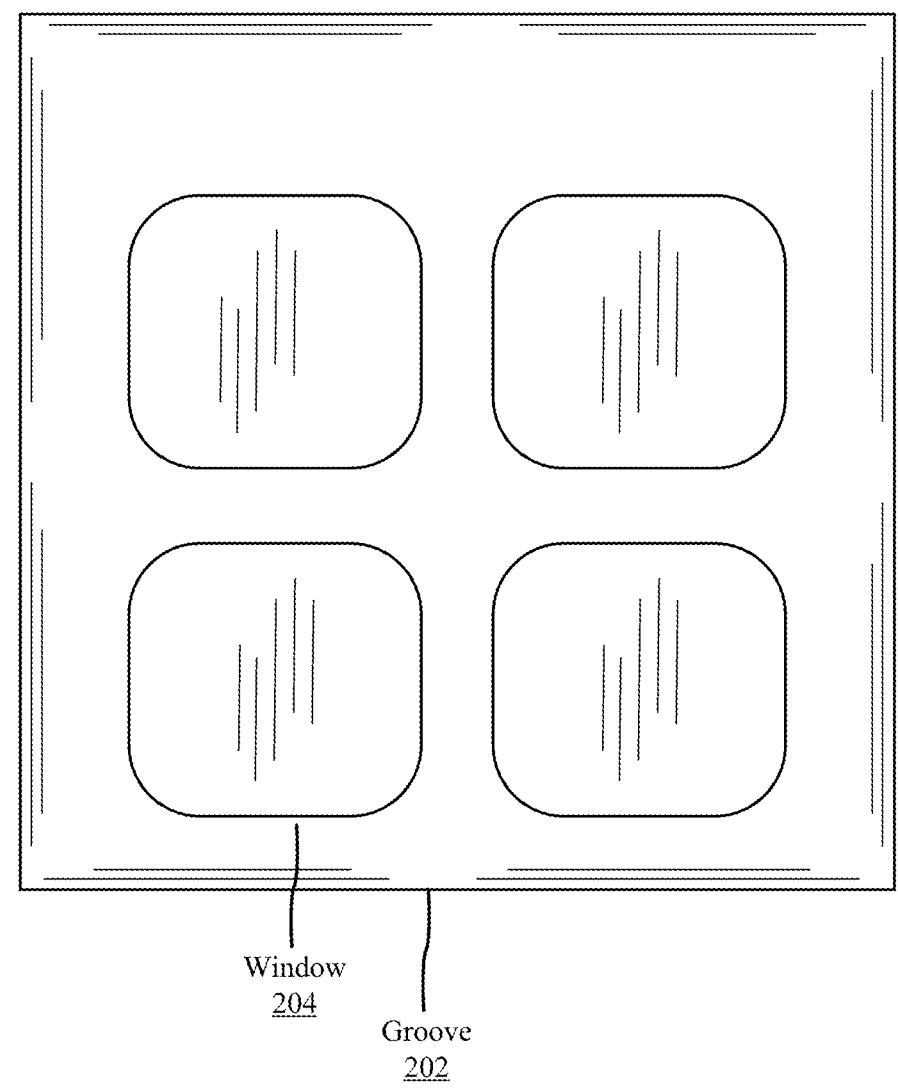
Figure 3A:
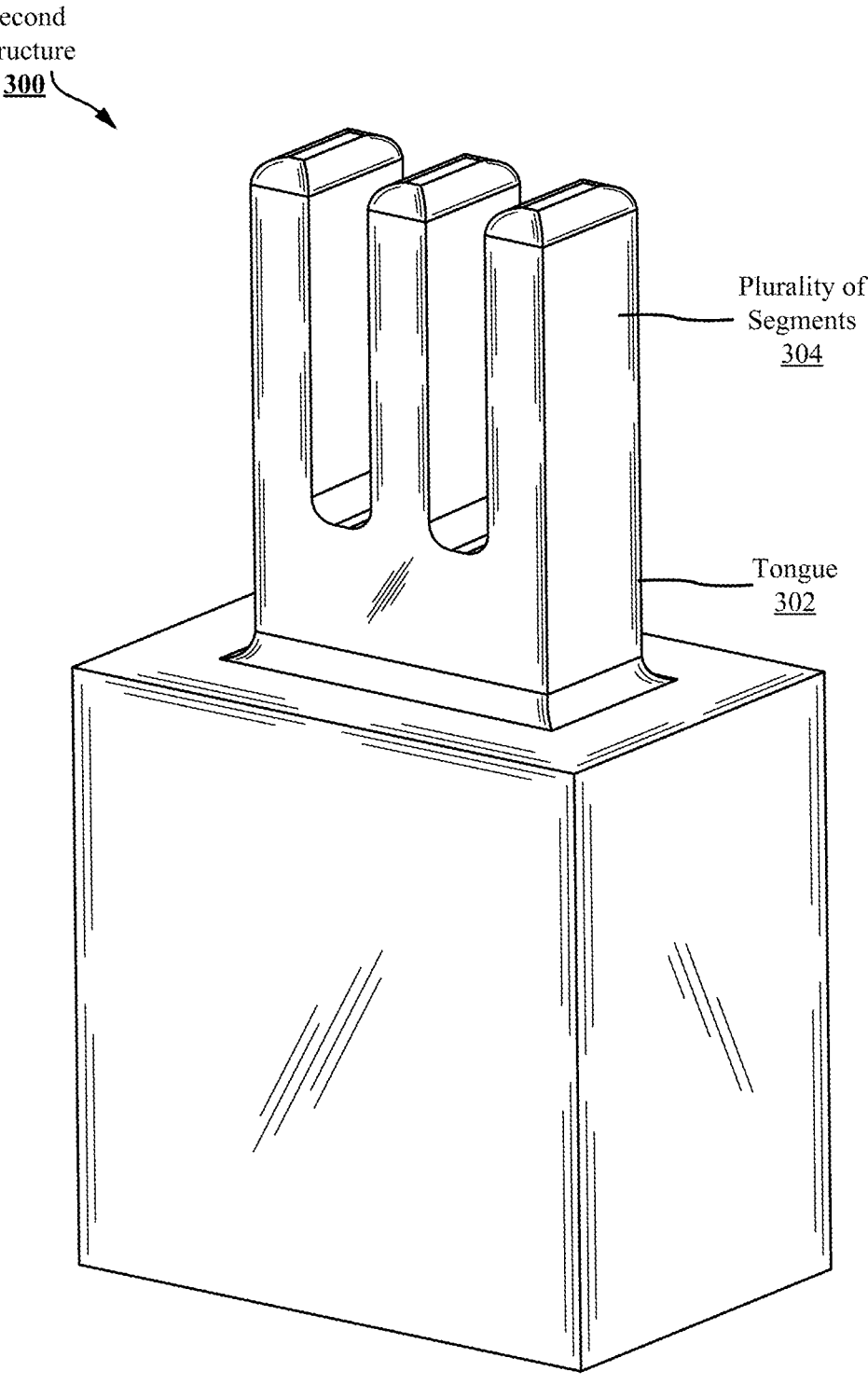
FIGS. 3A-3B illustrate an example of a second structure including a tongue for contacting a quick-cure adhesive.
Figure 3B:
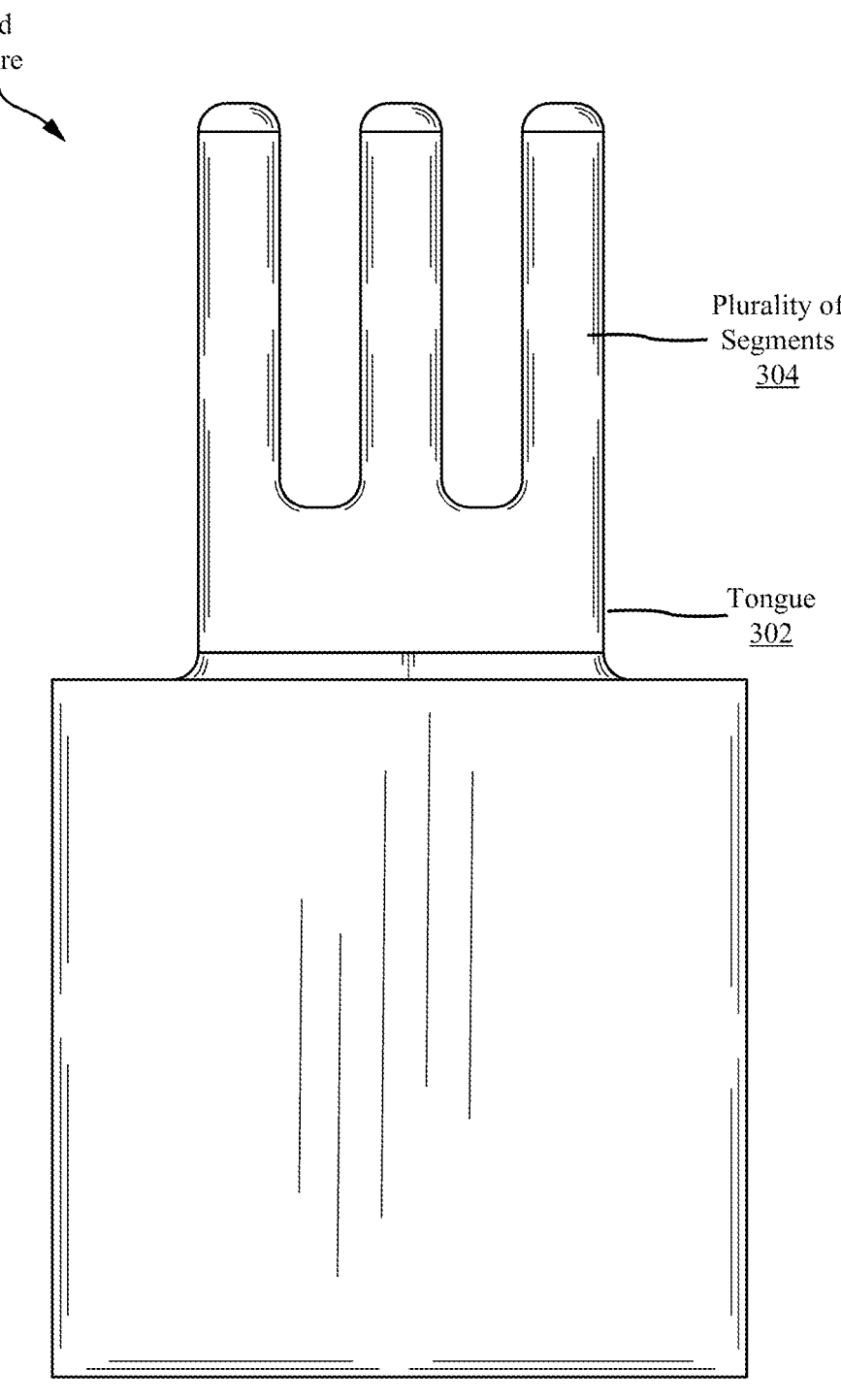
Figure 4A:
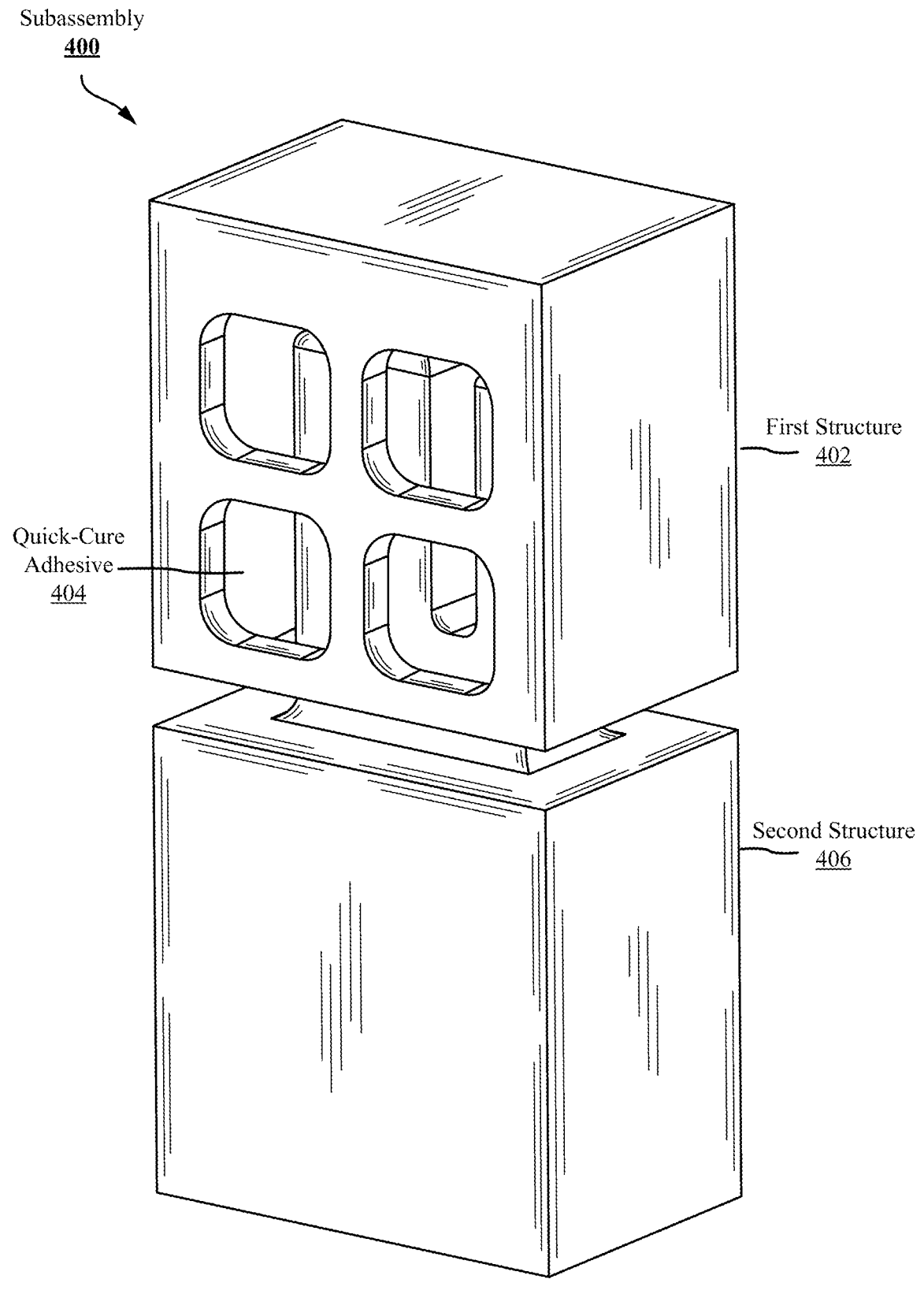
FIGS. 4A-4B illustrate an example of the first structure of FIGS. 2A-2B joined to the second structure of FIGS. 3A-3B.
Figure 4B:
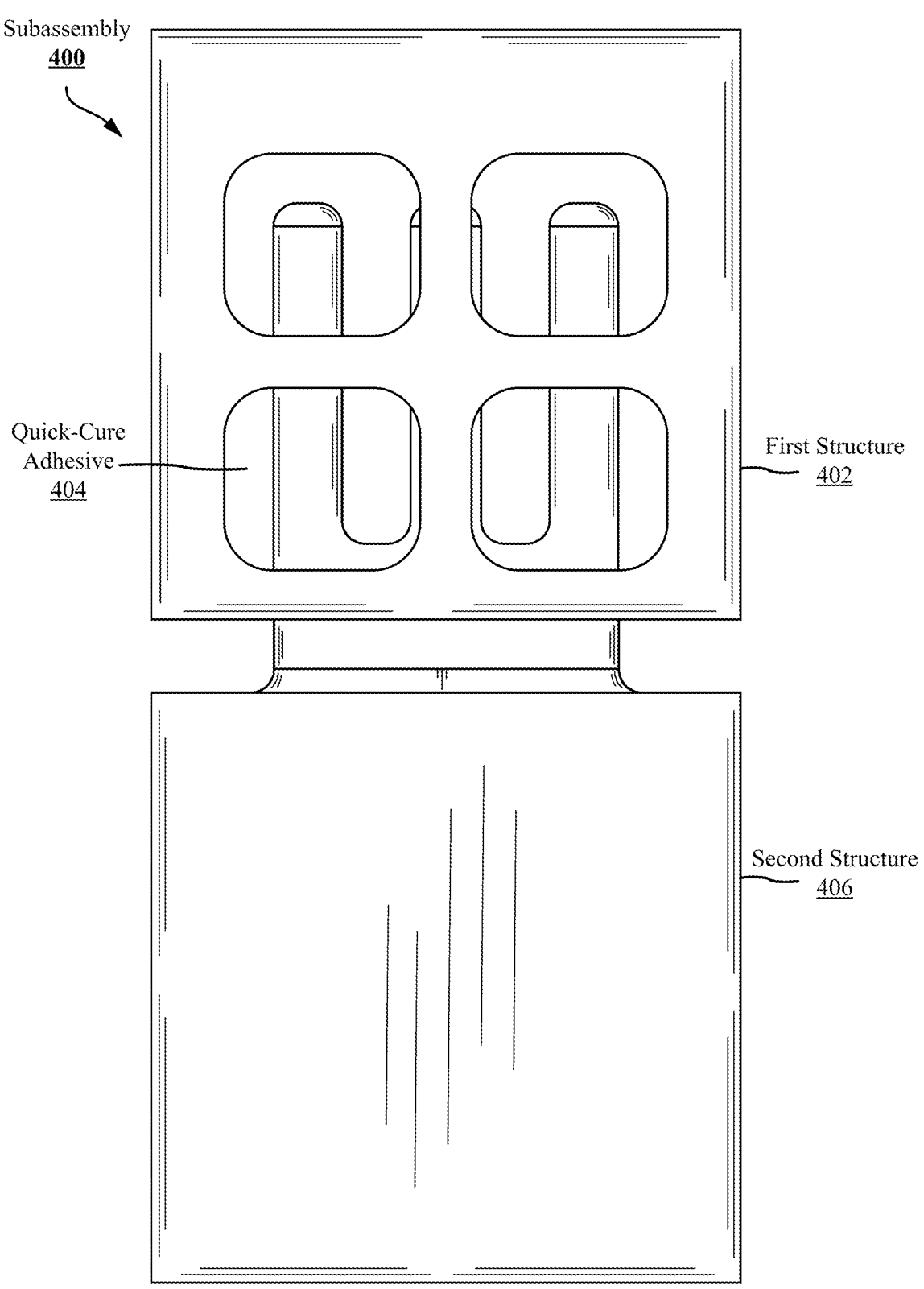

To reduce the likelihood of improper retention of structures during the fixtureless assembly process, the present disclosure provides retention features in the first and second structures (e.g., first structure 123 and second structure 125) that allow for quick-cure adhesive to be applied before the structures are placed in joining proximity. FIGS. 2A and 2B illustrate an example of a first structure 200 including a retention feature in the form of a groove (e.g. a recess, etc.), and FIGS. 3A and 3B illustrate an example of a second structure 300 including a retention feature in the form of a tongue (e.g. a projection, etc.). Moreover, FIGS. 4A and 4B illustrate an example of a subassembly 400 including a first structure 402 (e.g. first structure 200) joined to a second structure 406 (e.g. second structure 300) using the aforementioned retention features.

Referring to the aforementioned Figures, first structure 123, 200, 402 of subassembly 300 includes a groove 202 in which an adhesive dispensing robot (e.g., robot 113, 115, or 117) may inject quick-cure adhesive 404. The first structure may also include a window 204 (e.g. a translucent or transparent screen) opposite the groove in which a quick-cure adhesive robot may emit EM radiation to cure the quick-cure adhesive contained within the groove. Second structure 125, 300, 406 of subassembly 400 may include a tongue 302 which a material handling robot (e.g. robot 109 or 111) may place into the quick-cure adhesive within the groove of the first structure. The tongue may include a plurality of segments 304 spaced apart from each other (e.g. comb shape 506 in FIG. 5) or a plurality of openings (e.g. waffle shape 502 in FIG. 5) which contact the quick-cure adhesive when the tongue is inserted into the groove. While the "first" structure is referred to herein as having the groove, and the "second" structure is referred to herein as having the tongue, the present disclosure is not so limited. For example, second structure 125, 300, 346 may include the groove containing the quick-cure adhesive, and first structure 123, 200, 402 may include the tongue inserted into the quick-cure adhesive.

Figure 5:
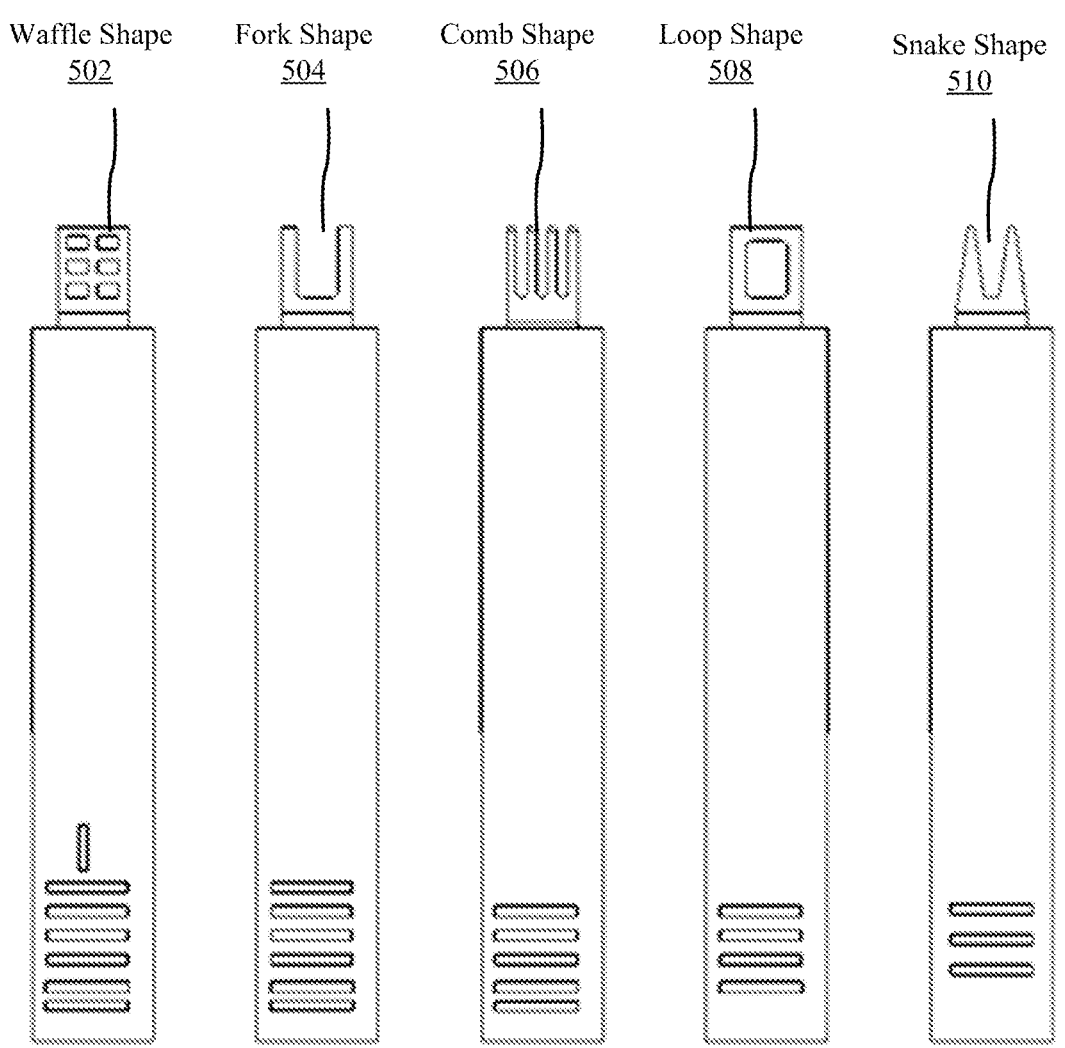
FIG. 5 illustrates various examples of tongue types for the second structure of FIGS. 3A-3B.

Tongue 302 may be selected from various types. FIG. 5 illustrates examples of different tongue types 500. For instance, the tongue may include a waffle shape 502, a fork shape 504, a comb shape 506, a loop shape 508, or a snake shape 510. The tongue may alternatively take other shapes. The shape of the tongue may be selected to maximize the strength of the adhesive bond between the first structure and the second structure and/or to optimize printability (e.g. in additive manufacturing). For example, when the tongue is adhered in the groove, a tongue with comb shape 506 may require a maximum pull force of approximately 100 N more than a tongue with the other aforementioned tongue types (e.g. due to additional surface area contacting the adhesive between the plurality of segments 304). Therefore, a comb-shaped tongue may be selected for tongue 302 to maximize strength. Alternatively, a tongue with waffle shape 502 may be selected with similar (but slightly less) strength, since the waffle shape may have easier printability than the other aforementioned tongue types (e.g. due to the plurality of openings in the waffle shape). Therefore, a waffle-shaped tongue may alternatively be selected for tongue 302 to optimize printability. Other tongue types may be selected to balance adhesive strength and printability.

Figure 6:
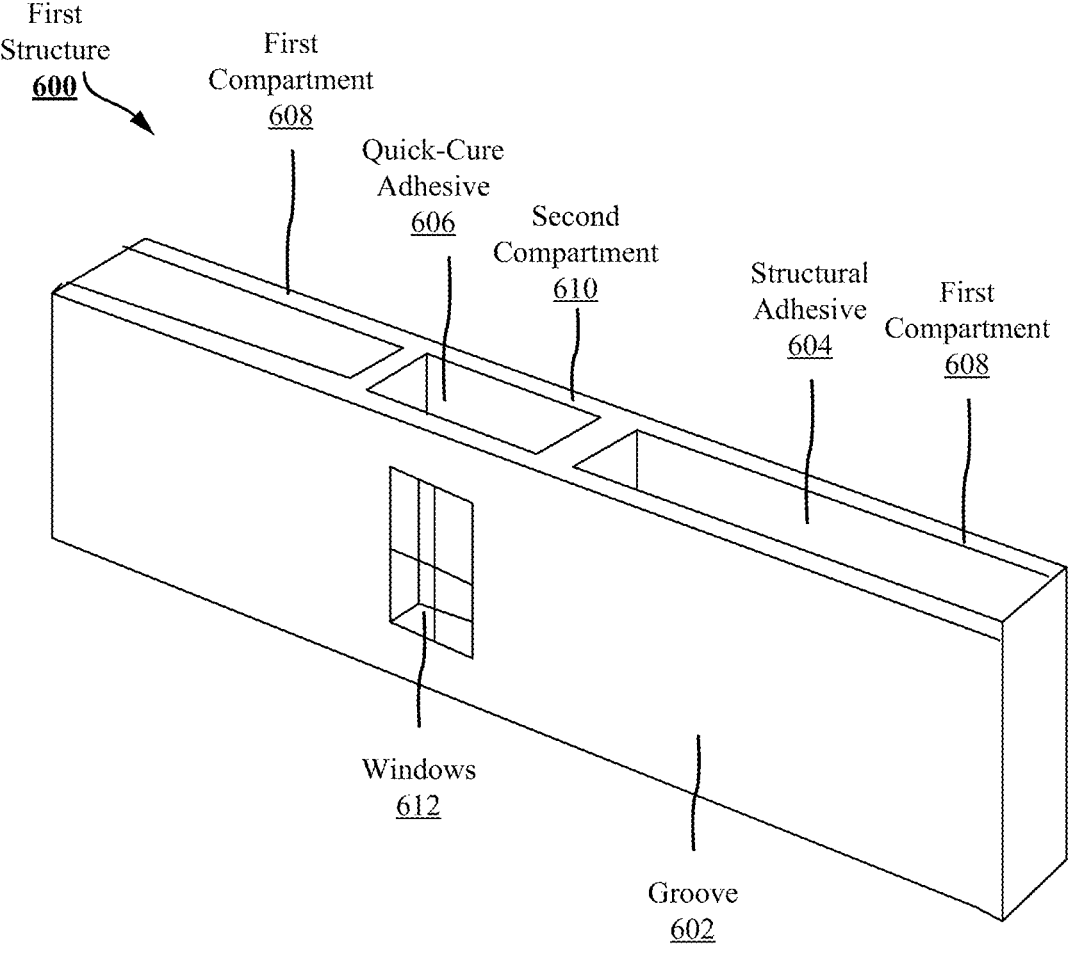
FIG. 6 illustrates another example of a first structure including a groove with compartments for separately containing a structural adhesive and a quick-cure adhesive.

In one example, the structural adhesive may be separate from the quick-cure adhesive. That is, the structural adhesive may be a first adhesive that cures at a first cure rate upon exposure to time or heating, and the quick-cure adhesive may be a second adhesive that cures at a second cure rate faster than the first cure rate upon exposure to EM radiation (e.g. UV radiation). FIG. 6 illustrates an example of a first structure 600 (e.g. first structure 123, 200, 402) including a groove 602 (e.g. groove 202) containing a structural adhesive 604 and a quick-cure adhesive 606 in separate compartments. For example, the groove may include one or more first compartments 608 that contain the structural adhesive and one or more second compartments 610 that contain the quick-cure adhesive. One or more windows 612 (e.g. window 204) may be disposed opposite the second compartments to allow the quick-cure adhesive to be exposed to EM radiation (e.g. UV radiation) for curing. Compartments 608, 610 also serve to prevent the structural adhesive and the quick-cure adhesive from mixing together. As a result, the quick-cure adhesive that is exposed to the EM radiation through the one or more windows may be cured at the faster, second cure rate, while the structural adhesive is cured at the slower, first cure rate.

Figure 7:
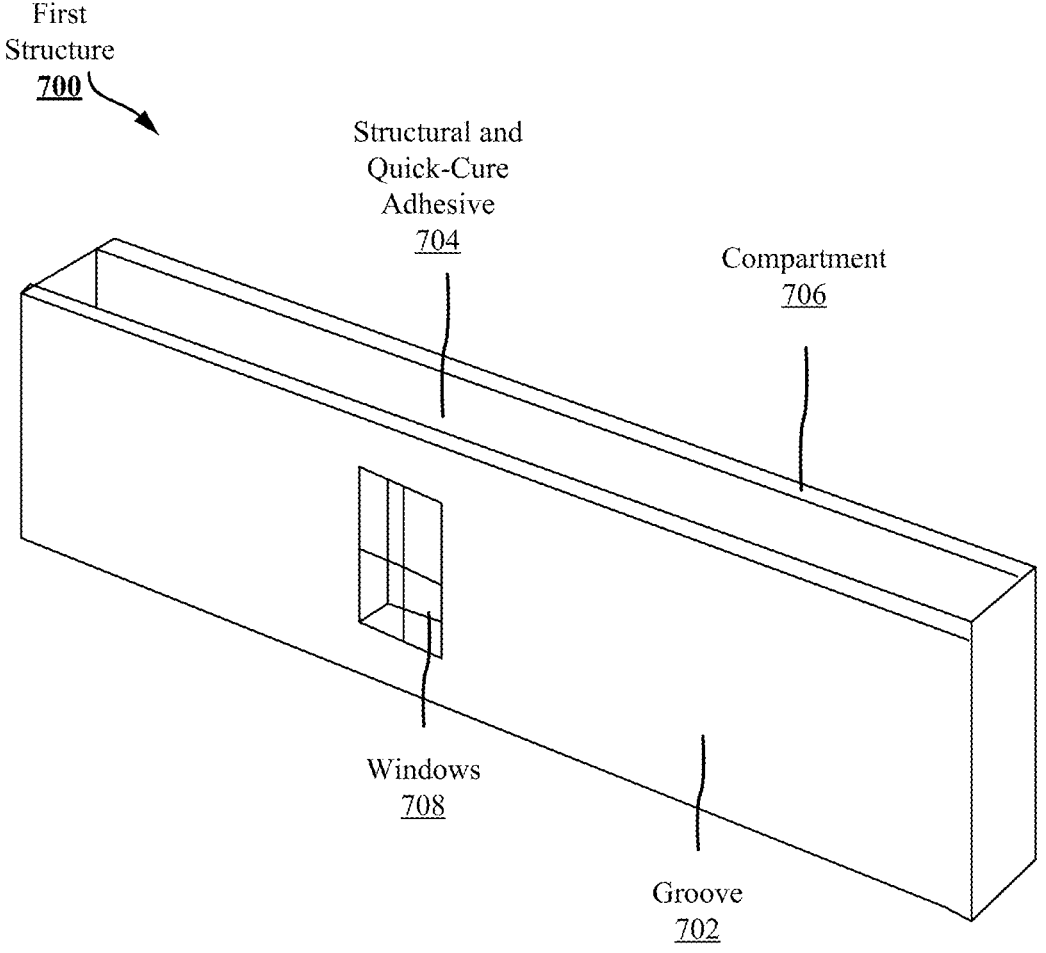
FIG. 7 illustrates another example of a first structure including a groove containing a single structural and quick-cure adhesive.

In another example, the structural adhesive and the quick-cure adhesive may be a single adhesive. That is, the structural adhesive and quick-cure adhesive may be combined into one adhesive that cures at a first cure rate upon exposure to time or heating and that cures at a second cure rate faster than the first cure rate upon exposure to EM radiation (e.g. UV radiation). FIG. 7 illustrates an example of a first structure 700 (e.g. first structure 123, 200, 402) including a groove 702 (e.g. groove 202) containing a single, structural and quick-cure adhesive 704. Unlike the example of FIG. 6, in this illustrated example, the structural and quick-cure adhesive may be contained in a single compartment 706 within the groove. One or more windows 708 (e.g. window 204) may be disposed at one or more locations to allow one or more portions of the structural and quick-cure adhesive to be exposed to EM radiation (e.g. UV radiation). As a result, the one or more portions of the structural and quick-cure adhesive exposed to the EM radiation may be cured at the faster, second cure rate, while the remainder of the adhesive that is not exposed to the EM radiation is cured at the slower, first cure rate.

Example operations of a fixtureless assembly system 800 (e.g., fixtureless assembly system 100) in connection with first structure 123, 200, 402, 600, 700 and second structure 125, 300, 406 will now be described with reference to FIGS. 8A through 8H. As described herein, the example operations may be caused by at least one of controllers 137, 139, 141, 143, 145, 147 communicatively coupled with robots 107, 109, 111, 113, 115, 117. In some embodiments, computing system 129 may issue commands to controllers 137, 139, 141, 143, 145, 147 to cause the example operations. Computing system 129 and/or controllers 137, 139, 141, 143, 145, 147 may cause the example operations based on CAD data, which may model the physical robots performing the example operations, and/or positional data, which may be provided by metrology system 131.

For the example operations of fixtureless assembly system 800, robots 107, 109, 111, 113, 115, 117 may be positioned relatively proximate to one another, e.g., at distances suitable for the example operations described below. In some embodiments, one or more robots 107, 109, 111, 113, 115, 117 may be positioned in fixtureless assembly system 800 at locations suitable for the one or more example operations prior to the example operations described below. At such locations, the respective bases of those one or more robots may be static throughout the example operations of fixtureless assembly system 800. However, movement of the robotics arms of robots 107, 109, 111, 113, 115, 117 may be controlled in coordination at various stages of fixtureless assembly system 800, such as by rotating about the respective bases, turning at a hinge, etc.

In some other embodiments, different robots 107, 109, 111, 113, 115, 117 may be dynamically (re)positioned at different distances from one another at different stages of fixtureless assembly. Carrier 119 may be configured to move one or more robots 107, 109, 111, 113, 115, 117 to their respective positions, e.g., according to execution by one or more processors of one or more sets of instructions associated with fixtureless assembly. Whether static or dynamic, the respective locations at which each of robots 107, 109, 111, 113, 115, 117 is positioned may be based on one or more sets of coordinates associated with fixtureless assembly system 800 (e.g., one or more sets of absolute coordinates).

Figure 8A:
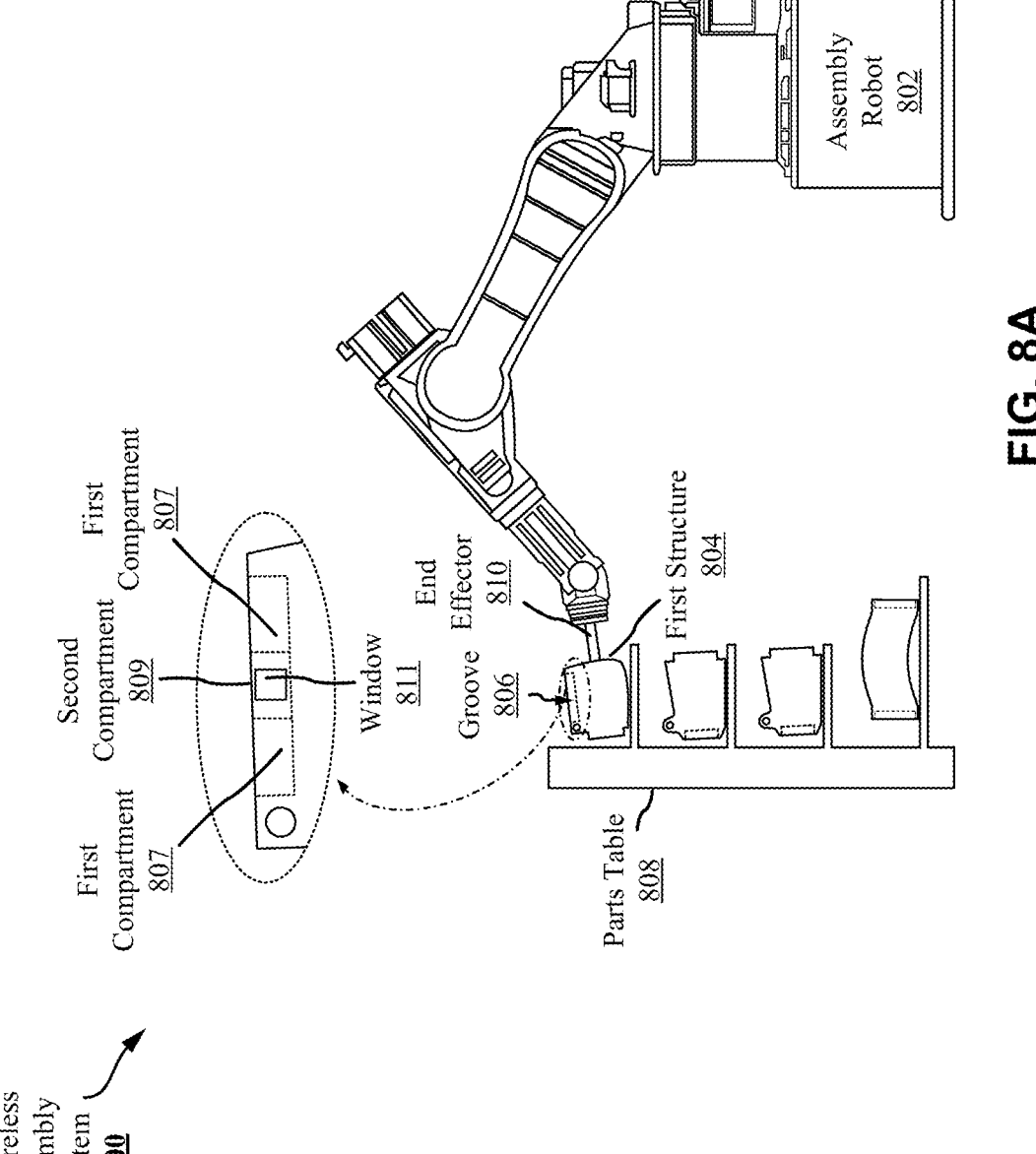
FIGS. 8A-8H illustrate perspective views of an example assembly system, which includes a plurality of robots configured to perform various example operations for assembly of at least a portion of a vehicle.

Referring first to FIG. 8A, assembly robot 802 (e.g. robot 109, 111) can engage first structure 804 (e.g., first structure 123, 200, 402, 600, 700). The first structure may include one or more features that enable joining of the first structure with one or more other structures. Illustratively, the first structure may include a groove 806 (e.g. the groove 202, 602, 702) on a first surface and may include a tongue (e.g. tongue 302) on a second surface. The groove 806 may include one or more first compartments 807 (e.g., first compartment 608), one or more second compartments 809 (e.g., second compartment 610), and one or more windows 811 (e.g., window 204, 612) disposed opposite the second compartment. Alternatively, the groove 806 may include a single compartment (e.g. compartment 706) and the window 811 (e.g., window 708) may be disposed opposite the single compartment. The first surface and the second surface of first structure 804 may be approximately opposite surfaces (e.g., the first surface may be on a left or top side of the first structure and the second surface may be on a right or bottom side of the first structure, or vice versa).

Assembly robot 802 may be located relatively proximate to parts table 808 (e.g. parts table 121). At such a location, the robotic arm of assembly robot 802 may be within a proximity at which the robotic arm of assembly robot 802 is able to reach at least a portion of the parts located on parts table 808. In the example embodiment of FIG. 8A, assembly robot 802 may be located at one side of parts table 808, and the tongue of first structure 804 may be relatively closer to assembly robot 802 than groove 806 of first structure 804 at such a location of assembly robot 802.

Assembly robot 802 may be connected to an end effector 810. Illustratively, the distal end of the robotic arm of assembly robot 802 may be connected to end effector 810, which may be built onto the distal end of the robotic arm (where the proximal end of the robotic arm is connected to assembly robot 802) or may be attached to the robotic arm (and may be fixed or removable). End effector 810 of assembly robot 802 may be configured to engage (e.g., pick up) and retain one or more structures. For example, end effector 810 of assembly robot 802 may be configured to engage with different structures, such as via one or more features of the different structures. Some examples of such an end effector may include jaws or grippers.

Assembly robot 802 may engage with first structure 804, e.g., approximately at groove 806 side of first structure 804. Specifically, the robotic arm of assembly robot 802 may move to a position at which end effector 810 of assembly robot 802 can engage first structure 804. At this position, end effector 810 of assembly robot 802 engages with first structure 804, e.g., at the same side and/or surface as the tongue of first structure 804. Once engaged, assembly robot 802 may retain first structure 804, e.g., by means of end effector 810. When first structure 804 is retained by assembly robot 802, assembly robot 802 may move first structure 804 to one or more positions at which one or more example operations of fixtureless assembly may be performed, as further described below.

Figure 8B:
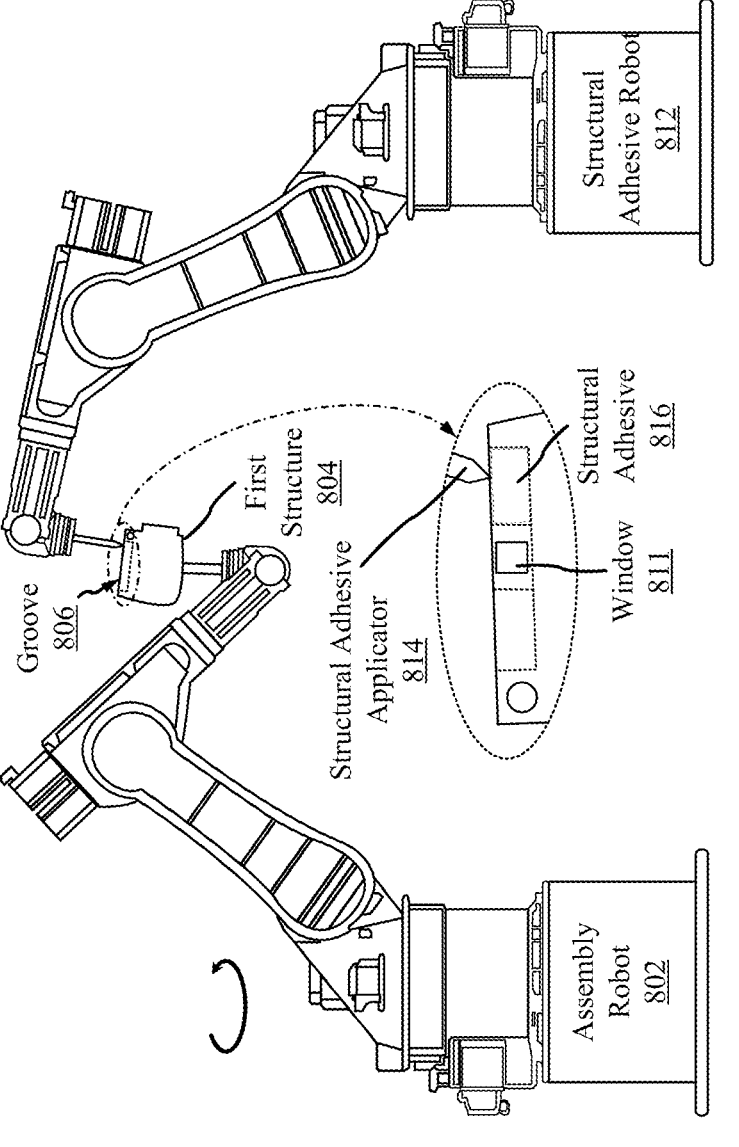

Next referring to FIG. 8B, assembly robot 802 may turn to face structural adhesive robot 812. The distal end of the robotic arm of assembly robot 802 may be positioned toward structural adhesive robot 812, and similarly, the distal end of the robotic arm of structural adhesive robot 812 may be positioned toward assembly robot 802.

At this example location illustrated in FIG. 8B, assembly robot 802 may move first structure 804 to a position at which first structure 804 is approximately between assembly robot 802 and structural adhesive robot 812. Further, assembly robot 802 may orient first structure 804 so that groove 806 of first structure 804 is facing approximately upward, such as by causing the robotic arm of assembly robot 802 and/or end effector 810 of assembly robot 802 to move such that first structure 804 is oriented approximately upward.

Structural adhesive robot 812 may be connected to a structural adhesive applicator 814 or other similar tool. Illustratively, the distal end of the robotic arm of structural adhesive robot 812 may be connected to structural adhesive applicator 814, which may be built onto the distal end of the robotic arm (where the proximal end of the robotic arm is connected to structural adhesive robot 812) or may be attached to the robotic arm (and may be fixed or removable). Structural adhesive applicator 814 of structural adhesive robot 812 may be configured to deposit adhesive on structural surfaces.

When first structure 804 is suitably positioned (e.g., between the two robots 802, 812), structural adhesive robot 812 may cause application of the adhesive to first structure 804. Specifically, structural adhesive robot 812 may deposit structural adhesive 816 into groove 806 of first structure 804. To do so, structural adhesive robot 812 may move its robotic arm to a position such that structural adhesive applicator 814 is above groove 806 of first structure 804, and is sufficiently close so that a controlled amount of the adhesive can be deposited within a defined area while avoiding deposition of the adhesive on unintended surfaces or portions of surfaces. For example, where groove 806 includes first compartments 807, the defined area in which the structural adhesive 816 is deposited may include the first compartment 807, but not the second compartment 809. At such an above position, an adhesive application tip of structural adhesive applicator 814 may be approximately directly above groove 806, and may be pointed downward into groove 806 (e.g., into first compartment(s) 807).

When suitably positioned, structural adhesive robot 812 may cause structural adhesive applicator 814 to deposit the controlled amount of adhesive into groove 806. The controlled amount of adhesive may at least partially fill groove 806. In some embodiments, the controlled amount of adhesive may entirely or nearly entirely fill the first compartments 807 of groove 806. The amount of adhesive, however, may be controlled such that the adhesive does not overflow outside groove 806 and onto the first surface of first structure 804 that bounds groove 806. For example, the amount of adhesive deposited in groove 806 may be controlled such that the adhesive does not leak onto any surfaces of first structure 804 when a protrusion of another structure is inserted into groove 806 when first structure 804 is joined with the other structure.

Figure 8C:
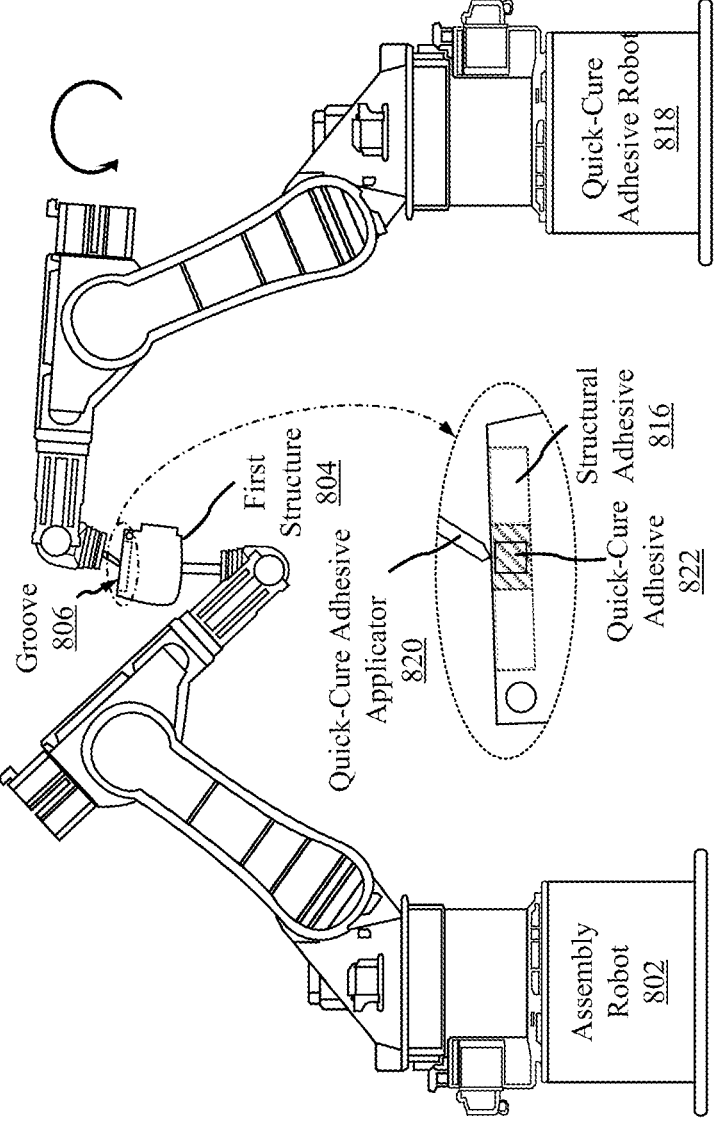

Now referring to FIG. 8C, a quick-cure adhesive robot 818 (e.g. robot 115) may be connected to a quick-cure adhesive applicator 820 or other similar tool. Illustratively, the distal end of the robotic arm of quick-cure adhesive robot 818 may be connected to quick-cure adhesive applicator 820, which may be built onto the distal end of the robotic arm (where the proximal end of the robotic arm is connected to quick-cure adhesive robot 818) or may be attached to the robotic arm (and may be fixed or removable). Quick-cure adhesive applicator 820 of quick-cure adhesive robot 818 may be configured to deposit quick-cure adhesive 822 on structural surfaces.

Quick-cure adhesive robot 818 may be separate from structural adhesive robot 812. For example, after structural adhesive robot 812 deposits structural adhesive 816 into groove 806, assembly robot 802 may turn to face quick-cure adhesive robot 818. The distal end of the robotic arm of assembly robot 802 may be positioned toward quick-cure adhesive robot 818, and similarly, the distal end of the robotic arm of quick-cure adhesive robot 818 may be positioned toward assembly robot 802. Alternatively, structural adhesive robot 812 may be the same as quick-cure adhesive robot 818. For example, if structural adhesive applicator 814 is removable from the robotic arm of structural adhesive robot 812, structural adhesive robot may switch the structural adhesive applicator 814 with the quick-cure adhesive applicator 820 (e.g. by replacing one applicator or end effector with the other), thereby becoming quick-cure adhesive robot 818. Structural adhesive robot 812 and/or quick-cure adhesive robot 818 may alternatively include multiple applicators (built-in or removable) that are configured to separately deposit different types of adhesive, such as structural adhesive applicator 814 and quick-cure adhesive applicator 820. Alternatively, where the different types of adhesives are combined (e.g. structural and quick-cure adhesive 704), structural adhesive robot 812 and/or quick-cure adhesive robot 818 may include a single applicator (built-in or removable) that is configured to deposit the combined adhesive.

When first structure 804 is suitably positioned (e.g., between the two robots 802, 818), quick-cure adhesive robot 818 may cause application of the quick-cure adhesive 822 to first structure 804. Specifically, quick-cure adhesive robot 818 may deposit quick-cure adhesive 822 into groove 806 of first structure 804. To do so, quick-cure adhesive robot 818 may move its robotic arm to a position such that quick-cure adhesive applicator 820 is above groove 806 of first structure 804, and is sufficiently close so that a controlled amount of the adhesive can be deposited within a defined area while avoiding deposition of the adhesive on unintended surfaces or portions of surfaces. For example, where groove 806 includes first compartments 807 and second compartment 809, the defined area in which the quick-cure adhesive 822 is deposited may include the second compartment 809, but not the first compartments 807. Alternatively, where the groove 806 includes a single compartment to receive a combined adhesive (e.g. structural and quick-cure adhesive 704), the defined area in which the combined adhesive is deposited may include the single compartment (as a whole). In either case, at such an above position, an adhesive application tip of quick-cure adhesive applicator 820 may be approximately directly above groove 806, and may be pointed downward into groove 806 (e.g., into second compartment 809 or the single compartment of the groove).

When suitably positioned, quick-cure adhesive robot 818 may cause quick-cure adhesive applicator 820 to deposit the controlled amount of adhesive into groove 806. The controlled amount of adhesive may at least partially fill groove 806. In some embodiments, the controlled amount of adhesive may entirely or nearly entirely fill the second compartment 809 of groove 806. The amount of adhesive, however, may be controlled such that the adhesive does not overflow outside groove 806 and onto the first surface of first structure 804 that bounds groove 806. For example, the amount of adhesive deposited in groove 806 may be controlled such that the adhesive does not leak onto any surfaces of first structure 804 when a protrusion of another structure is inserted into groove 806 when first structure 804 is joined with the other structure.

Figure 8D:
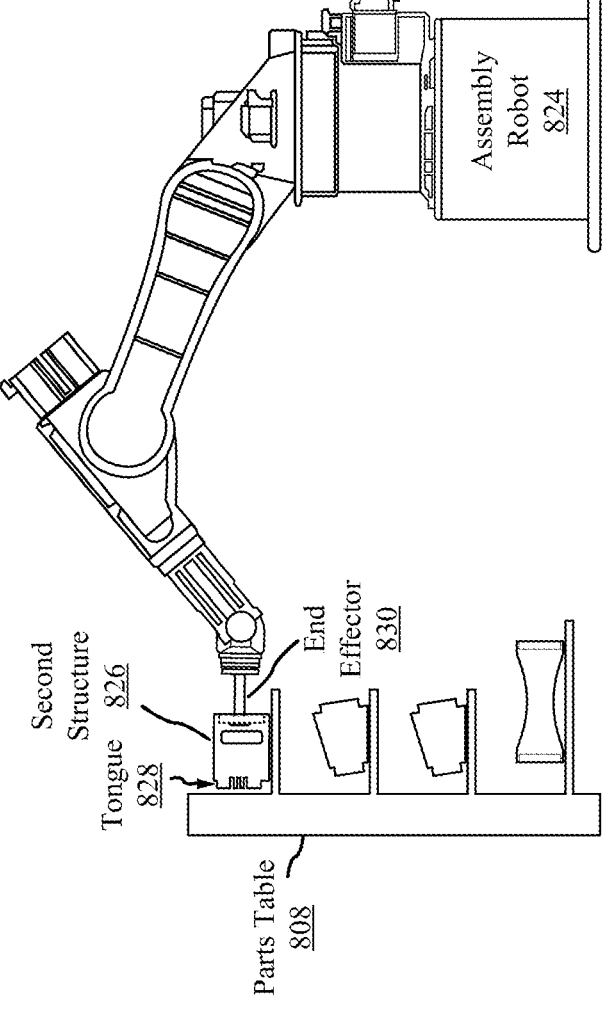

Turning to FIG. 8D, an assembly robot 824 (e.g. robot 109, 111 or keystone robot 107) can engage second structure 826 (e.g. second structure 125, 300, 406). Similar to first structure 804, second structure 826 may include one or more features that enable joining of second structure 826 with one or more other structures. In the illustrated embodiment, second structure 826 may include a groove on a first surface and may include a tongue 828 (e.g. tongue 302) on a second surface. The first surface and the second surface of second structure 826 may be each on respective planes that are approximately perpendicular to one another, and therefore, tongue 828 may be at an angle of approximately 90 degrees from the groove.

Second structure 826 may be located on parts table 808, and assembly robot 824 may be located relatively proximate to parts table 808. At such a location, the robotic arm of assembly robot 824 may be within a proximity at which the robotic arm of assembly robot 824 is able to reach at least a portion of the parts located on parts table 808. In the example embodiment of FIG. 8D, assembly robot 824 may be located at one side of parts table 808, and tongue 828 of second structure 826 may be positioned toward the side of parts table 808 that is relatively opposite from the one side at which assembly robot 824 is located. At this position, the groove of second structure 826 may be oriented at an angle of approximately 90 degrees from assembly robot 824.

Assembly robot 824 may be connected to an end effector 830. Illustratively, the distal end of the robotic arm of assembly robot 824 may be connected to end effector 830, which may be built onto the distal end of the robotic arm (where the proximal end of the robotic arm is connected to assembly robot 824) or may be attached to the robotic arm (and may be fixed or removable). End effector 830 of assembly robot 824 may be configured to engage (e.g., pick up) and retain one or more structures. For example, end effector 830 of assembly robot 824 may be configured to fixturelessly engage with different structures, such as via one or more features of the different structures. Some examples of such an end effector may include jaws or grippers.

Assembly robot 824 may engage with second structure 826 at a third surface of the second structure, e.g., at angles of approximately 90 degrees and 180 degrees from the groove side and tongue side, respectively, of second structure 826. Specifically, the robotic arm of assembly robot 824 may be moved to a position at which the assembly robot 824 can engage second structure 826, and assembly robot 824 may then engage and retain second structure 826 at the third surface using end effector 830.

Figure 8E:
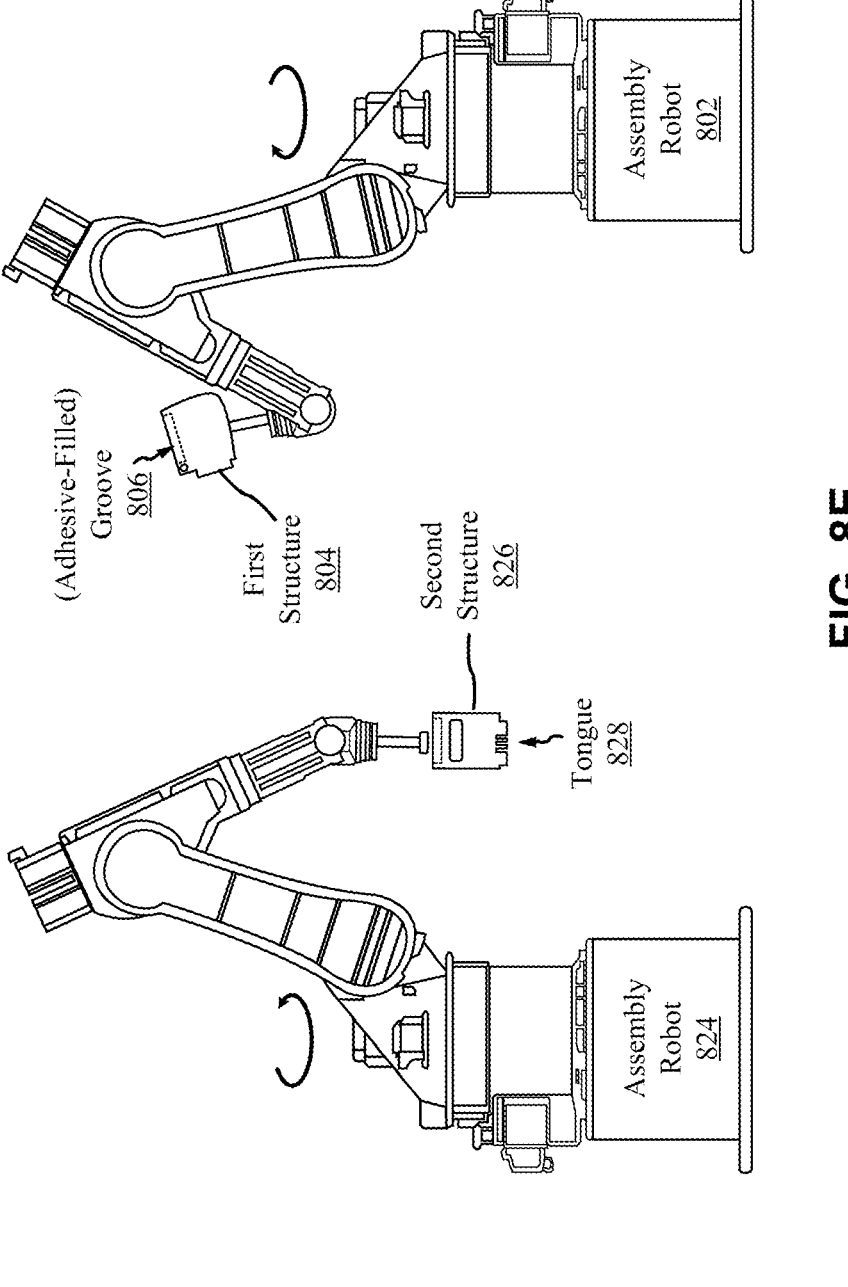

With respect to FIG. 8E, assembly robot 824 may turn to face assembly robot 802, and assembly robot 802 may turn to face assembly robot 824. The distal end of the robotic arm of assembly robot 824 may be positioned toward assembly robot 802, and similarly, the distal end of the robotic arm of assembly robot 802 may be positioned toward assembly robot 824.

At this example location illustrated in FIG. 8E, assembly robot 824 may move second structure 826 to a position at which second structure 826 is approximately between assembly robot 824 and assembly robot 802. Further, assembly robot 824 may orient second structure 826 so that tongue 828 of second structure 826 is facing approximately downward, such as by causing the robotic arm of assembly robot 824 and/or end effector 830 of assembly robot 824 to move such that second structure 826 is oriented approximately downward.

In some embodiments, assembly robot 824 may move second structure 826 according to one or more vectors, which may be based on CAD modeling. Each of the one or more vectors may indicate a magnitude (e.g., distance) and a direction according to which second structure 826 is to be moved by assembly robot 824. Each vector may be intended to bring second structure 826 within the joining proximity, although some vectors may be intermediary vectors intended to bring second structure 826 to a position at which a vector for joining first and second structures 804, 826 can be applied.

Assembly robot 802 may position first structure 804 relatively closer to assembly robot 802 than assembly robot 824. In some embodiments, assembly robot 802 may position first structure 804 to be at least partially above at least a portion of second structure 826. For example, assembly robot 802 may retain first structure 804 at an approximately overhead position.

Figure 8F:
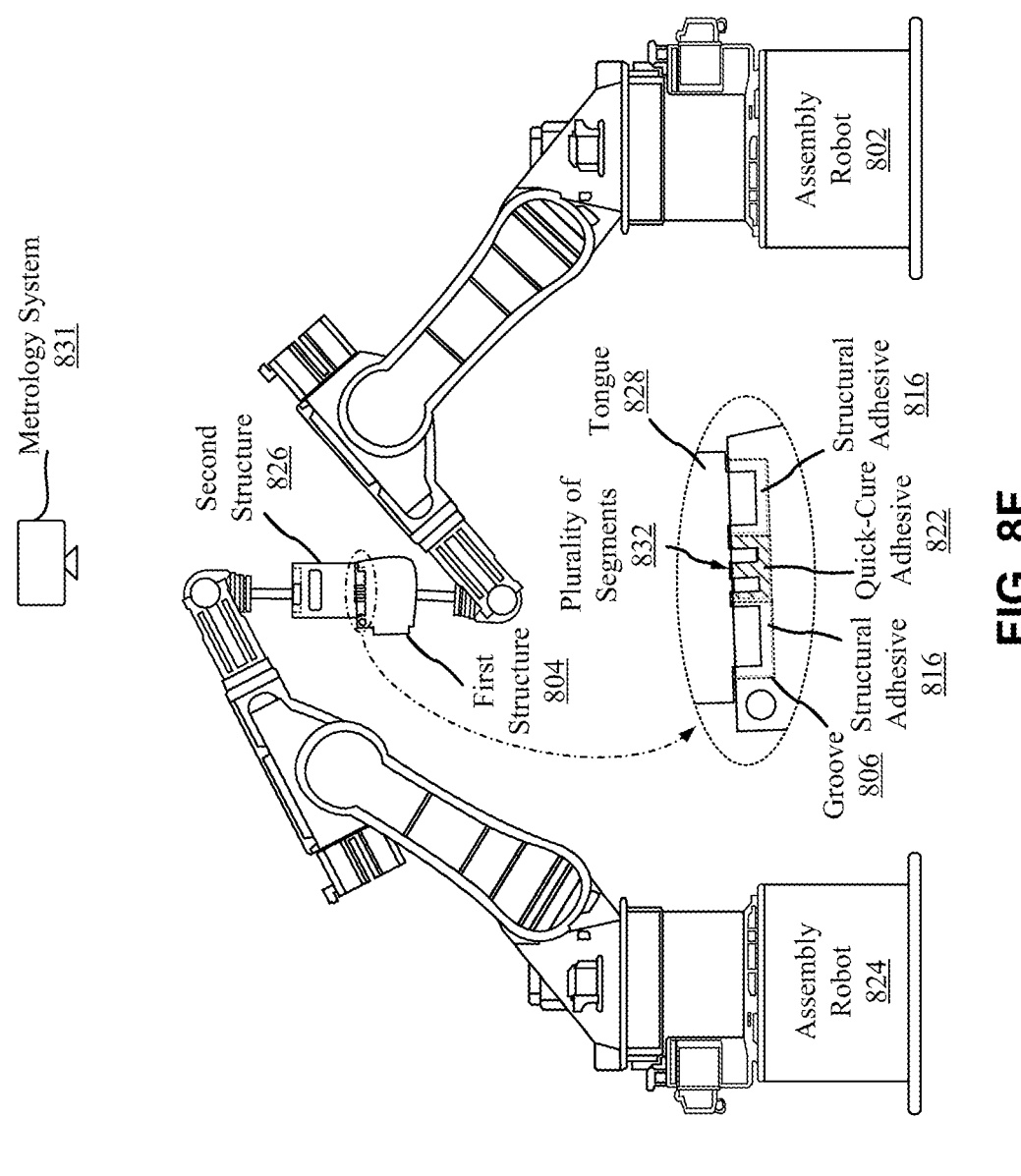

Now referring to FIG. 8F, assembly robot 802 and assembly robot 824 may move first structure 804 and second structure 826, respectively, to positions close to each other. First structure 804 may be positioned to be below second structure 826, for example, such that first structure 804 and second structure 826 at least partially overlap in the elevational plane (or vertical space). Assembly robot 802 may orient first structure 804 so that groove 806 of first structure 804 is facing approximately upward, having the controlled amount of structural adhesive 816 and quick-cure adhesive 822 (or combined adhesive) previously deposited therein. For example, assembly robot 802 may cause the robotic arm of assembly robot 802 and/or end effector 810 of assembly robot 802 to move such that groove 806 of first structure 804 is oriented approximately upward. Thus, groove 806 of first structure 804 may face tongue 828 of second structure 826. Similar to the movement of second structure 826 by assembly robot 824, assembly robot 802 may move first structure 804 according to one or more vectors, which may be based on CAD modeling. Assembly robot 824 may retain second structure 826 at the previously described position with tongue 828 of second structure 826 oriented approximately downwardly; although second structure 826 may now be positioned above first structure 804 due to the movement of first structure 804 caused by assembly robot 802.

To bring first and second structures 804, 826 within the joining proximity, one or both of the first and/or second structures may be moved by one or both of assembly robot 802, 824, respectively. For example, assembly robot 802 may cause the distal end of its robotic arm, at which first structure 804 is engaged, to move in an approximately upwardly direction toward second structure 826. Additionally or alternatively, assembly robot 824 may cause the distal end of its robotic arm, at which second structure 826 is engaged, to move in an approximately downwardly direction toward first structure 804.

In various embodiments, joining structures engaged by robots in fixtureless assembly system 800 may be accomplished using an MMC procedure. The MMC procedure may use metrology system 831 (e.g., metrology system 131), which may be configured to determine (e.g., detect, calculate, measure, capture, etc.) positional data associated with fixtureless assembly cell 105. In the context of FIG. 8F, metrology system 831 may determine positional data associated with at least one of first structure 804 and/or second structure 826. For example, metrology system 831 may determine a set of coordinates associated with first structure 804. The set of coordinates may indicate the physical position of first structure 804 in fixtureless assembly cell 105 and/or relative to the joining proximity or second structure 826. Metrology system 831 may provide the positional data to computing system 129. Computing system 129 may receive the positional data and, based on the positional data, may determine a set of corrective operations to be applied so that first structure 804 can be brought within the joining proximity and joined with second structure 826. For example, computing system 129 may determine a difference between the set of coordinates associated with first structure 804 and the joining proximity. Computing system 129 may provide the set of corrective operations to the controller communicatively connected with assembly robot 802, such as by issuing a set of commands to the controller. The controller may apply the set of commands by controlling the robotic arm of assembly robot 802 according to the set of corrective operations indicated by the set of commands.

When structures are within the joining proximity, at least a portion of one structure overlaps with at least a portion of another structure in at least one of the azimuthal (or horizon) plane and/or the elevational plane. According to such an overlap, one or more features of one structure may connect with one or more complementary features of another structure, e.g., by interlocking or fitting together, such as when a protrusion of one structure is inserted into a recess of another structure. In the illustrated example operations of fixtureless assembly system 100, tongue 828 of second structure 826 may be positioned within groove 806 of first structure 804 when first structure 804 and second structure 826 are within the joining proximity, thereby creating a tongue-and-groove joint.

In some embodiments, tongue 828 of second structure 826 may not contact first structure 804 at the joining proximity. In other words, the robots can be controlled to bring the structures within joining proximity while preventing the structures from contacting each other. For example, tongue 828 of second structure 826 may be within groove 806 of first structure 804, but lateral bond gaps between the tongue and the sides of the groove, and a vertical bond gap between the tongue and the bottom of the groove, can be caused because the tongue is inserted in the groove without contacting the sides and bottom. Rather, tongue 828 of second structure 826 may merely contact the adhesive(s) deposited in groove 806 of first structure 804 when first structure 804 and second structure 826 are at the joining proximity. For example, as illustrated in FIG. 8F, tongue 828 may include a plurality of segments 832 (e.g., plurality of segments 304) that contact the quick-cure adhesive 822 within second compartment 809 of groove 806, while a remaining portion of the tongue may contact the structural adhesive 816 within the first compartments 807 of groove 806. In some further embodiments, however, the surface surrounding groove 806 of first structure 804 may contact the surface surrounding tongue 828 of second structure 826.

Figure 8G:
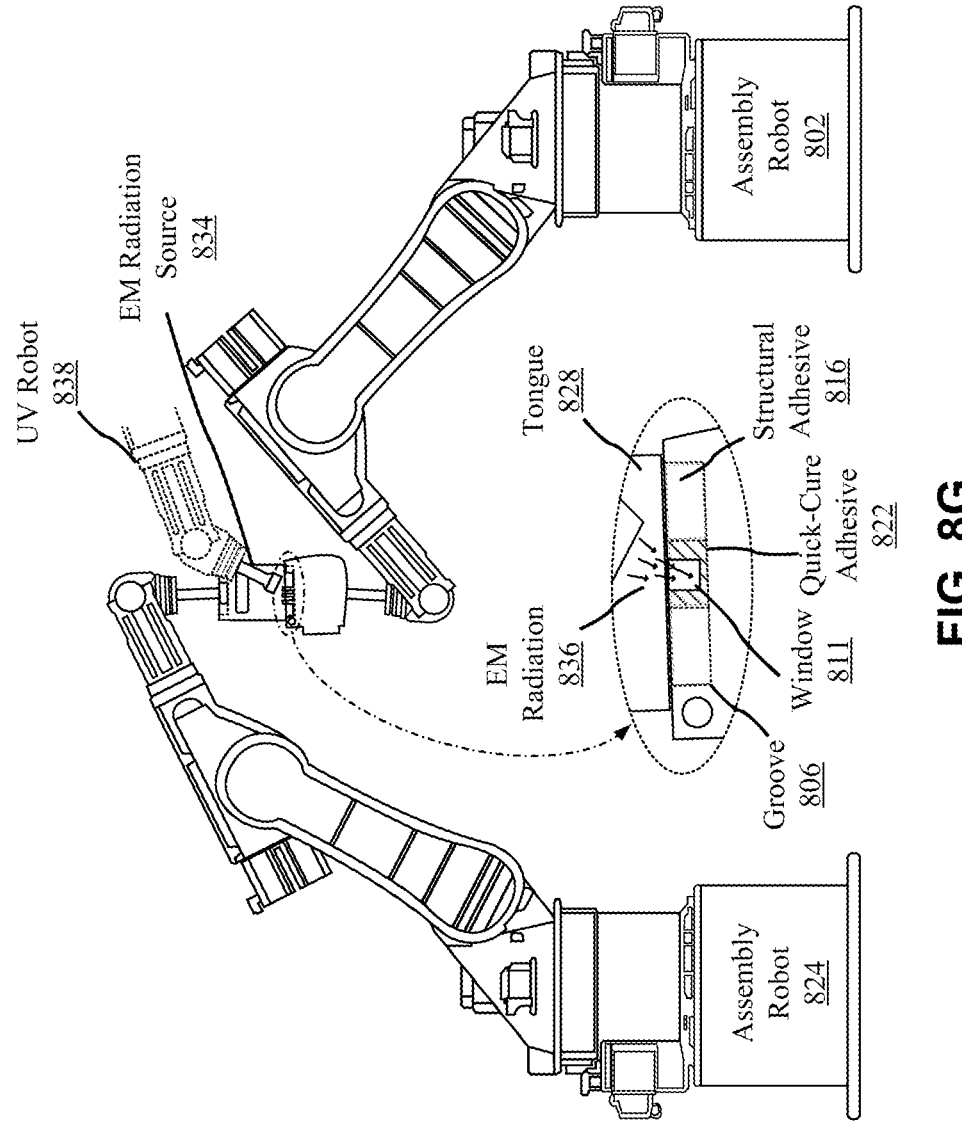

Now referring to FIG. 8G, assembly robots 802, 824 may remain at their respective positions such that second structure 826 and first structure 804 are joined at the joining proximity. With such positioning maintained, an EM radiation source 834 may be configured to bond first structure 804 and second structure 826 when joined. For example, EM radiation source 834 may be configured to apply UV light or other EM radiation 836 to cure the quick-cure adhesive 822, thereby bonding first structure 804 and second structure 826. The bond created by the EM radiation source 834 may be temporary, while the structural adhesive 816 may provide a permanent bond when cured. In one example, EM radiation source 834 may be connected to a UV robot 838 (e.g., robot 115, which may be the same as the quick-cure adhesive robot 818 or a different robot). For instance, as illustrated in FIG. 8G, EM radiation source 834 may be fixed or removably attached as an end effector (e.g., a UV light applicator or other curing device) to a distal end of a robotic arm of UV robot 838. While the following description refers to this example where EM radiation source 834 is connected to UV robot 838, the EM radiation source 834 is not so limited. For example, EM radiation source 834 may not be attached to a robot, but may instead be separately positioned or mounted at any location within assembly cell 105 (e.g., on a wall, ceiling, etc.). In such case, assembly robots 802, 824 may bring the first and second structures 804, 826 within proximity of the EM radiation source 834 to bond the joined structures.

UV robot 838 may be located relatively proximate to assembly robot 824 and assembly robot 802. The distal end of the robotic arm of UV robot 838 may be positioned toward first structure 804 and second structure 826, and specifically, toward the point at which first structure 804 and second structure 826 are joined (e.g., toward the tongue-and-groove joint). In such a position, the distal end of the robotic arm of UV robot 838 may be between assembly robot 824 and assembly robot 802.

The distal end of the robotic arm of UV robot 838 may be positioned such that EM radiation source 834 connected with the UV robot 838 is proximate to the point at which first structure 804 and second structure 826 are joined. For example, the robotic arm of UV robot 838 may be positioned such that the EM radiation source is positioned at a distance from the tongue-and-groove joint (formed by joining first structure 804 and second structure 826 at the joining proximity) that is suitable for receiving the EM radiation 836 at the tongue-and-groove joint. At this suitable distance, UV robot 838 may emit EM radiation 836 towards the tongue-and-groove joint formed by joining first structure 804 and second structure 826.

UV robot 838 may position EM radiation source 834 at a distance from quick-cure adhesive 822 that is suitable for curing the quick-cure adhesive. With EM radiation source 834 at this distance, UV robot 838 (e.g., computing system 129 or the controller of UV robot 838) may cause EM radiation source 834 to cure the quick-cure adhesive or other temporary adhesive. For example, UV robot 838 may cause EM radiation source 834 to emit UV light or other EM radiation for a time sufficient to cure the UV adhesive. However, UV robot 838 may not cure the structural adhesive, e.g., because the structural adhesive may not be curable through exposure to UV light. Accordingly, in one example as illustrated in FIG. 8G, UV robot 838 may emit EM radiation 836 through window 811 into groove 806 to cure the quick-cure adhesive 822 within second compartment 809 while the first structure 804 and second structure 826 are joined. Alternatively, in another example where groove 806 includes a single compartment and contains the combined structural and quick-cure adhesive, UV robot 838 may emit EM radiation 836 through window 811 into groove 806 to cure the exposed portion of the combined adhesive through the window within the single compartment. Similarly, where EM radiation source 834 is not attached to a UV robot and is instead located elsewhere in assembly cell 105, computing system 129 may cause EM radiation source 834 to cure the quick-cure adhesive as described above when the first and second structures are proximal to the EM radiation source.

Once the quick-cure adhesive is cured, UV robot 838 may move its robotic arm away from first structure 804 and second structure 826. First structure 804 and second structure 826 may be at least temporarily bonded by the cured, quick-cure adhesive. However, the structural adhesive (applied by structural adhesive robot 812, as shown above in FIG. 8B) may still be uncured at this stage.

Figure 8H:
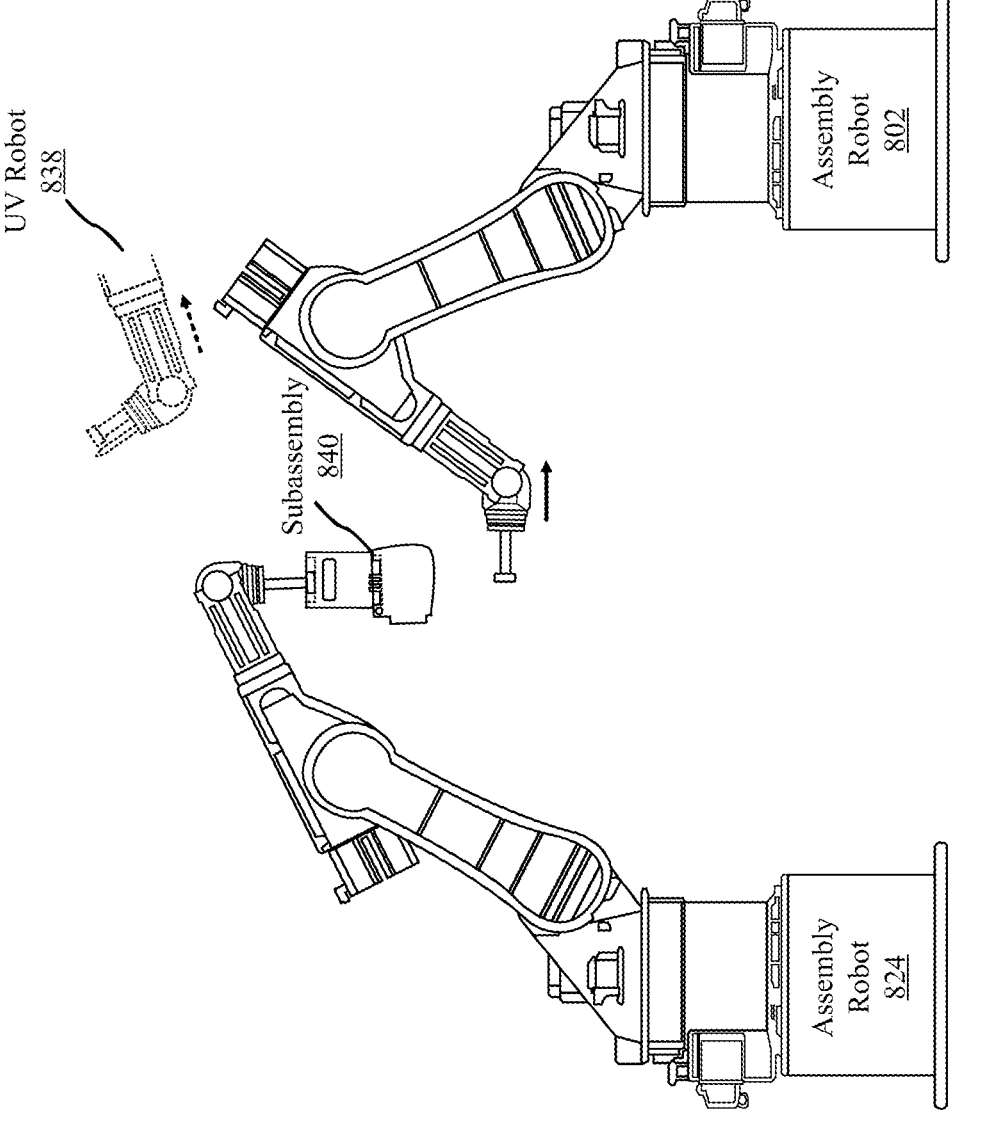
Figure 8H:
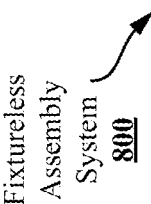

Finally, FIG. 8H illustrates that assembly robot 824 may remain at its position, and may continue to retain second structure 826. At this stage, second structure 826 may be at least temporarily bonded to first structure 804, e.g., through the cured quick-cure adhesive within groove 806 of the first structure.

Assembly robot 802 may separate from first structure 804. For example, assembly robot 802 may cause its end effector to disengage from first structure 804, such as by opening jaws of end effector 810, unfastening end effector 810 from one or more features of first structure 804, and/or otherwise causing end effector 810 to release first structure 804.

Once separated from first structure 804, assembly robot 802 may move its robotic arm away from first structure 804. For example, assembly robot 802 may retract its robotic arm away from assembly robot 824. In so doing, assembly robot 824 may be provided a greater area to move about.

As assembly robot 802 is separated from first structure 804, assembly robot 824 may retain first structure 804, e.g., through its retention of second structure 826 that is at least temporarily bonded with first structure 804. The cured quick-cure adhesive may provide a sufficient bond to support this retention of first structure 804, bonded with second structure 826, even though assembly robot 824 does not directly retain first structure 804 (e.g., when end effector 830 of assembly robot 824 is engaging second structure 826). When bonded (even temporarily), first structure 804 and second structure 826 may be a structure and/or may be referred to as a subassembly 840. Assembly robot 824 may then retain the subassembly 840 or move the subassembly to another robot such as keystone robot 107. Alternatively, assembly robot 824 may be the keystone robot 107.

The robots may iterate through example operations of fixtureless assembly system 100, 800 similar to those described above in FIGS. 8A through 8H to fixturelessly assemble one or more subassemblies that are at least portion of a vehicle, such as a frame, chassis, body, panel, etc. During the example operations, keystone robot 107 may continuously retain the subassembly, as assembly robots 802, 824 (and/or other assembly robots) engage and retain other structures, structural adhesive robot 812 applies structural adhesive 816 to each of the other structures, quick-cure adhesive robot 818 applies quick-cure adhesive 822 to each of the other structures, assembly robots 802, 824 (and/or other assembly robots) join each of the other structures with the subassembly retained by keystone robot 107, UV robot 838 applies and cures the quick-cure adhesive to at least temporarily bond each of the other structures joined with the subassembly, and then the assembly robot(s) release each of the other structures after the quick-cure adhesive or other temporary adhesive is cured. Multiple subassemblies may be joined and temporarily bonded to form an assembly, which may then be moved to an oven or otherwise left to remain at a certain temperature over a period of time to cure the structural adhesive 816 and permanently bond the structures.

Figure 9:
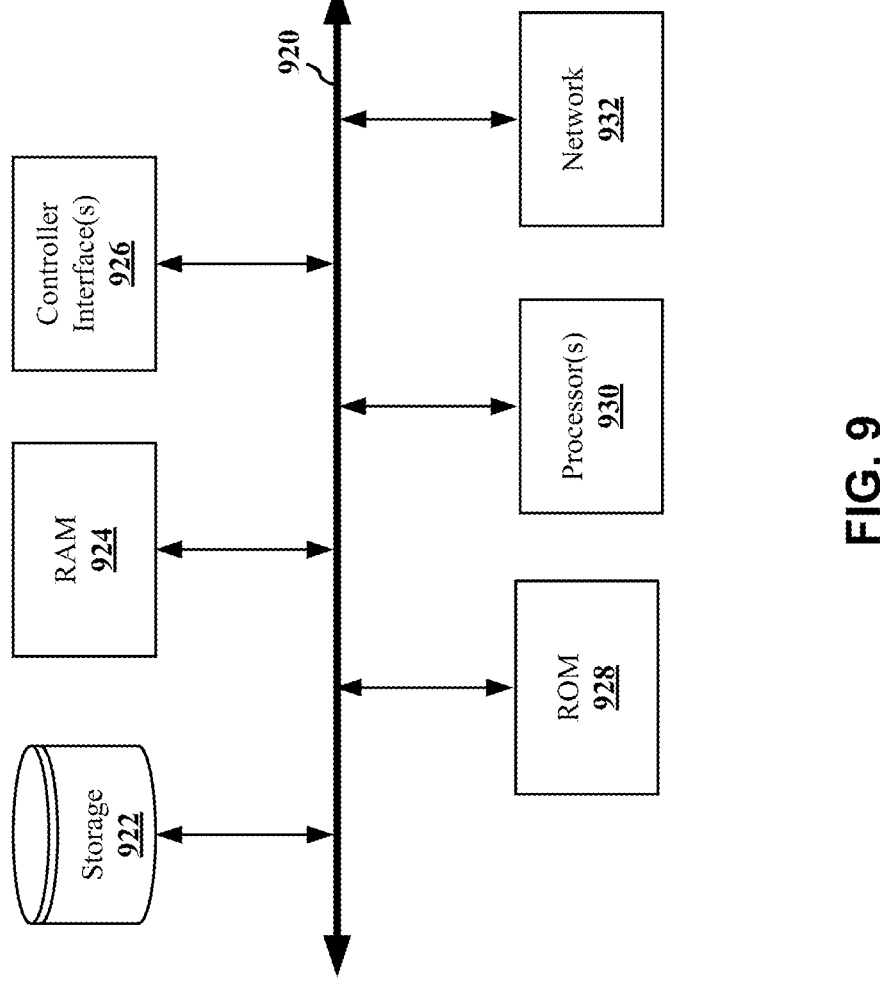
FIG. 9 is a block diagram of an example controller processing system configured to execute one or more sets of instructions to direct at least one robot for various operations associated with assembly of at least a portion of a vehicle.
Figure 9:

With respect to FIG. 9, a block diagram illustrates an embodiment of a processing system 900. The processing system 900 may comprise at least one controller associated with at least one robot. For example, referring to FIG. 1, the processing system 900 may be an embodiment of at least one of the controllers 137, 139, 141, 143, 145, 147 associated with at least one of the robots 107, 109, 111, 113, 115, 117.

The processing system 900 may include various types of machine-readable media and interfaces. As illustrated, the system 900 includes at least one interconnect 920 (e.g., at least one bus), a permanent storage device 922, random-access memory (RAM) 924, at least one controller interface(s) 926, read-only memory (ROM) 928, at least one processor(s) 930, and a network component 932.

The interconnect 920 may communicatively connect components and/or devices that are collocated with the system 900, such as internal components and/or internal devices within a housing of the system 900. For example, the interconnect 920 may communicatively connect the processor(s) 930 with the permanent storage device 922, RAM 924, and/or ROM 928. The processor(s) 930 may be configured to access and load computer-executable instructions from at least one of the permanent storage device 922, RAM 924, and/or ROM 928.

The permanent storage device 922 may be non-volatile memory that stores instructions and data, independent of the power state (e.g., on or off) of the system 900. For example, the permanent storage device 922 may be a hard disk, flash drive, or another read/write memory device.

ROM 928 may store static instructions enabling basic functionality of the system 900, as well as the components therein. For example, ROM 928 may store instructions for the processor(s) 930 to execute a set of processes associated with robot of at least a portion of a vehicle, for example, as described with respect to one or more of the robots, above. Examples of ROM 928 may include erasable programmable ROM (EPROM) or electrically EPROM (EEPROM), compact disc ROM (CD-ROM) or other optical disk storage, magnetic disk storage or other magnetic storage devices, and/or another computer-accessible and computer-readable medium that may store program code as instructions and/or data structures.

RAM 924 may include volatile read/write memory. RAM 924 may store computer-executable instructions associated with runtime operation(s) by the processor(s) 930. In addition, RAM 924 may store real-time data captured during assembly of at least a portion of a vehicle, for example, as described with respect to one or more of FIGS. 1 and 8A-8H, above.

The processor(s) 930 may be implemented with one or more general-purpose and/or special-purpose processors. Examples of general-purpose and/or special-purpose processors may include microprocessors, microcontrollers, DSP processors, and/or any other suitable circuitry configured to execute instructions loaded from at least one of the permanent storage device 922, RAM 924, and/or ROM 928. Alternatively or additionally, the processor(s) 930 may be implemented as dedicated hardware, such as at least one field programmable gate array (FPGA), at least one programmable logic device (PLD), at least one controller, at least one state machine, a set of logic gates, at least one discrete hardware component, or any other suitable circuitry and/or combination thereof.

The interconnect 920 may further communicatively connect the system 900 with one or more controller interface(s) 926. The controller interface(s) 926 may communicatively connect the system 900 with various circuitry associated with one or more robots, for example, during assembly of at least a portion of a vehicle. Instructions executed by the processor(s) 930 may cause instructions to be communicated with a robot through the controller interface(s) 926, which may cause movement and/or other actions of the robot in association with assembly of at least a portion of a vehicle. For example, instructions executed by the processor(s) 930 may cause signals to be sent through the controller interface(s) 926 to circuity and/or other machinery of a robot in order to direct movement and/or other actions of the robot in association with assembly of at least a portion of a vehicle.

In some embodiments, the system 900 may include a network component 932. The network component 932 may be configured to communicate over a network, for example, in order to transmit and/or receive instructions associated with assembly of at least a portion of a vehicle. Instructions communicated over a network through the network component 932 may include instructions associated with assembly of at least a portion of a vehicle, and may be communicated before, during, and/or after assembly of at least a portion of a vehicle. Examples of a network through which the network component 932 may communicate may include a local area network (LAN), a wide area network (WAN), the Internet, an intranet, or another wired or wireless network.

Various aspects described herein may be implemented at least partially as software processes of a computer-programming product. Such processes may be specified as a set of instructions recorded on a machine-readable storage medium. When a set of instructions is executed by the processor(s) 930, the set of instructions may cause the processor(s) to perform operations indicated and recorded in the set of instructions.

Accordingly, in an example of fixtureless assembly operation as described above with reference to FIGS. 1-9, a first material handling robot (e.g. robot 109, assembly robot 802) retains one of the structures (e.g. first structure 200, 402, 600, 700, 804) including the groove (e.g. groove 202, 602, 702, 806). One or more adhesive dispensing robots (e.g. robot 113, structural adhesive robot 812 and/or quick-cure adhesive robot 818) then fill structural adhesive 604, 816 into the groove (e.g. in compartment(s) 608, 807) and quick-cure adhesive 404, 606, 822 into the groove (e.g. in compartment(s) 610, 809) such that the quick-cure adhesive is inserted opposite window 204, 612, 708, 811. Alternatively, single, structural and quick-cure adhesive 704 may be inserted into the groove (e.g. in compartment 706). Next, a second material handling robot (e.g. robot 111, assembly robot 824) retains the other of the structures (e.g. second structure 300, 406, 826) including tongue 302, 828, and the first and second material handling robots position the first and second structures into joining proximity based on MMC. Once the optimal position of the structures is identified with MMC, the second material handling robot inserts the tongue of the second structure into the quick-cure adhesive within the groove. Once the tongue is inserted, a quick-cure robot (e.g. robot 115, UV robot 838) emits EM radiation 836 (e.g. UV radiation) that enters through the window into the groove, causing the quick-cure adhesive (or exposed portion of the structural and quick-cure adhesive) to cure and quickly retain the two structures. Afterwards, the robots may release the joined structure and perform other joining operations while the structural adhesive (or non-exposed portions of the structural and quick-cure adhesive) is allowed to cure.

As a result, the present disclosure improves the likelihood of proper retention of structures during the fixtureless assembly process. For example, the retention features of the structures allow the quick-cure adhesive robot to apply the quick-cure adhesive at the time the structural adhesive is applied, rather than later during the joining operation. In this way, the quick-cure adhesive robot may avoid the aforementioned difficulties (e.g. obstruction of laser tracking by the quick-cure adhesive robot during MMC) associated with applying adhesive within the tightly packed area between the material handling robots. Instead, the quick-cure adhesive robot may apply EM radiation to rapidly cure the adhesive (e.g. through the window of the groove) after the structures are positioned, improving efficiency of assembly. Additionally, flexibility in join locations may be increased (e.g. including upside down orientations), thereby allowing for more optimized positioning.

Moreover, the retention features of the structures allow the quick-cure adhesive within the groove to envelope the tongue, which provides a stronger, double-shear retention force than the single-shear retention force caused by bonding a surface of the groove to a surface of the tongue. The groove and window may also allow for the adhesive to be contained to minimize overflow or spill out when the tongue is inserted and/or the structures are maneuvered. As a result, the possibility of the adhesive dripping and the structures becoming misaligned may be reduced, thereby minimizing part deflection and drops in, e.g. stacked parts. Furthermore, the tongue may be optimized to minimize overflow and maximize the surface area in contact with the adhesive (e.g. through the plurality of segments or openings in the tongue) to maximize bond strength and/or optimize printability when additively manufactured. Thus, structures may be retained with acceptable tolerance while the structural adhesive is being cured, thereby mitigating retention failure and improving structural integrity. The retention features for the quick-cure adhesive may also be repeatably designed in different structures, thus decreasing the cycle time for completing an assembly. Consequently, cycle time of the assembly process, structural adhesive containment, printability of the parts, structural mass, and bonding strength may be optimized. Additionally, the visual appeal of the structures may be improved by minimizing visibility of quick-cure adhesive after application (e.g. by removing unsightly lines or globs of adhesive).

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
a first structure comprising a first compartment, a second compartment and a window, wherein the first compartment comprises a first adhesive, and the second compartment comprises a second adhesive, wherein the second adhesive is not within the first compartment, wherein the second adhesive comprises an electromagnetic (EM) radiation-cured adhesive and is different from the first adhesive, and wherein the window is located on the first structure to allow EM radiation to cure the second adhesive; and a second structure comprising a second protrusion extending into the second compartment and contacting the second adhesive, and a first protrusion extending into the first compartment and contacting the first adhesive to join the second structure to the first structure.

2. The apparatus of claim 1, wherein the EM radiation comprises ultraviolet (UV) radiation.

3. The apparatus of claim 1, wherein the window comprises a screen.

4. The apparatus of claim 1, wherein the first adhesive cures at a first rate and the second adhesive cures at a second rate, wherein the first rate is different from the second rate.

5. The apparatus of claim 4, wherein the second rate is a faster curing rate than the first rate.

6. The apparatus of claim 1, wherein the first compartment comprises a plurality of adhesive compartments, and the first adhesive is contained within the plurality of the adhesive compartments.

7. The apparatus of claim 6, wherein the first protrusion comprises a plurality of tongues, wherein a first tongue of the plurality of tongues extends within a first adhesive compartment of the plurality of adhesive compartments and a second tongue of the plurality of tongues extends within a second adhesive compartment of the plurality of adhesive compartments.

8. The apparatus of claim 1, wherein the second protrusion comprises a tongue having one of a waffle shape, a fork shape, a comb shape, a loop shape, or a snake shape.

9. The apparatus of claim 8, wherein the tongue comprises a plurality of segments spaced apart from each other.

10. The apparatus of claim 8, wherein the tongue comprises one or more openings.

11. The apparatus of claim 1, wherein the second protrusion does not contact the first structure.

12. The apparatus of claim 1, wherein the first protrusion does not contact the first structure.

13. The apparatus of claim 12, wherein the second protrusion does not contact the first structure.

* * * * *